(12) United States Patent
Chmiel et al.

(10) Patent No.: US 11,151,092 B2
(45) Date of Patent: Oct. 19, 2021

(54) DATA REPLICATION IN DISTRIBUTED FILE SYSTEMS

(71) Applicant: Qumulo, Inc., Seattle, WA (US)

(72) Inventors: Michael Anthony Chmiel, Seattle, WA (US); Kevin David Jamieson, North Vancouver (CA); Junjie Liang, Seattle, WA (US); Kevin Ross O'Neill, Seattle, WA (US); Sihang Su, Vancouver (CA)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/262,756

(22) Filed: Jan. 30, 2019

(65) Prior Publication Data

US 2020/0242082 A1    Jul. 30, 2020

(51) Int. Cl.
| | |
|---|---|
| G06F 16/178 | (2019.01) |
| H04L 29/08 | (2006.01) |
| G06F 16/18 | (2019.01) |
| G06F 16/182 | (2019.01) |

(52) U.S. Cl.
CPC ........ G06F 16/178 (2019.01); G06F 16/1844 (2019.01); G06F 16/1873 (2019.01); H04L 67/1097 (2013.01)

(58) Field of Classification Search
CPC .............. G06F 16/178; G06F 16/1844; G06F 16/1873; H04L 67/1097
See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 15/967,499 dated Jun. 27, 2018, pp. 1-15.

(Continued)

*Primary Examiner* — Vaishali Shah
(74) *Attorney, Agent, or Firm* — John W. Branch; Branch Partners PLLC

(57) ABSTRACT

Embodiments are directed to a replication engine that provides a root node for a file that may be associated with a replication snapshot where the file is comprised of the root node, internal nodes, and data nodes. The replication engine may start at the root node and traverse the file system. If a visited internal node has an epoch value that matches the epoch, the replication engine may continue the traversal by visiting a next unvisited adjacent internal node. If the visited internal node has an epoch value that mismatches the epoch, the replication engine may backtrack to a nearest adjacent internal node that matches the epoch. And, in response to visiting a data node the replication engine may be arranged to determine blocks that are associated with the data node and communicate a copy of the blocks to a target file system.

24 Claims, 13 Drawing Sheets

(56) References Cited

U.S. PATENT DOCUMENTS

| | | |
|---|---|---|
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,263 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,772,735 B2 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,213,040 B1 | 5/2007 | Stokes et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1* | 12/2013 | Subramanya ........... G06F 16/11 707/803 |
| 8,645,323 B2 | 2/2014 | Jackiewicz et al. |
| 8,661,447 B1 | 2/2014 | Olliff et al. |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,384,252 B2 | 7/2016 | Akirav et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1* | 9/2019 | Strauss ............... G06F 11/2094 |
| 10,437,509 B1 | 10/2019 | Alexeev et al. |
| 10,474,635 B1 | 11/2019 | Unger et al. |
| 10,534,758 B1 | 1/2020 | Carpenter et al. |
| 10,678,663 B1 | 6/2020 | Sharma et al. |
| 2001/0039622 A1 | 11/2001 | Hitz et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1* | 3/2006 | Marzinski ........... G06F 11/1466 |
| 2006/0089982 A1 | 4/2006 | Abbott et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0274047 A1 | 11/2009 | Kruys et al. |
| 2009/0319566 A1 | 12/2009 | Wald et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 8/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |

(56) References Cited

U.S. PATENT DOCUMENTS

| | | |
|---|---|---|
| 2012/0166478 A1 | 6/2012 | Das et al. |
| 2012/0204060 A1* | 8/2012 | Swift .................. G06F 11/1435 714/15 |
| 2012/0317079 A1 | 12/2012 | Shoens et al. |
| 2013/0019072 A1 | 1/2013 | Strasser et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1 | 9/2014 | A Hummaida et al. |
| 2014/0281307 A1* | 9/2014 | Peterson .................. G06F 3/065 711/162 |
| 2014/0281411 A1 | 9/2014 | Abdallah |
| 2014/0344222 A1* | 11/2014 | Morris ................ G06F 16/1844 707/634 |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0149736 A1 | 5/2015 | Kwon et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2015/0310035 A1 | 10/2015 | Godman et al. |
| 2016/0034356 A1* | 2/2016 | Aron .................. G06F 16/2246 707/649 |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0292013 A1 | 10/2016 | Li et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0032006 A1 | 2/2017 | Anglin et al. |
| 2017/0046143 A1 | 2/2017 | Kochhar et al. |
| 2017/0078164 A1 | 3/2017 | Hildebrand et al. |
| 2017/0091046 A1 | 3/2017 | Bangalore et al. |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1* | 7/2017 | Binder .................. G06T 15/005 |
| 2017/0286455 A1 | 10/2017 | Li et al. |
| 2017/0316321 A1 | 11/2017 | Whitney et al. |
| 2017/0344598 A1 | 11/2017 | Constantinescu et al. |
| 2017/0344905 A1 | 11/2017 | Hack et al. |
| 2018/0040029 A1 | 2/2018 | Zeng et al. |
| 2018/0101546 A1 | 4/2018 | Krasnow et al. |
| 2018/0288057 A1 | 10/2018 | Varadamma et al. |
| 2018/0314423 A1 | 11/2018 | Gong et al. |
| 2019/0095112 A1* | 3/2019 | Lingarajappa ........ G06F 3/0619 |
| 2019/0102700 A1 | 4/2019 | Babu et al. |
| 2019/0163591 A1 | 5/2019 | Ouyang et al. |
| 2020/0004977 A1 | 1/2020 | Araujo et al. |
| 2021/0042263 A1 | 2/2021 | Zdornov et al. |
| 2021/0042282 A1 | 2/2021 | Cseri et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |

OTHER PUBLICATIONS

Office Communication for U.S. Appl. No. 16/226,587 dated Feb. 25, 2019, pp. 1-46.
Office Communication for U.S. Appl. No. 15/473,051 dated Jun. 30, 2017, pp. 1-22.
Office Communication for U.S. Appl. No. 16/004,182 dated Mar. 5, 2019, pp. 1-46.
Office Communication for U.S. Appl. No. 16/004,182 dated Aug. 23, 2018, pp. 1-46.
Office Communication for U.S. Appl. No. 16/004,208 dated Aug. 27, 2018, pp. 1-11.
European Communication and European Search Report for European Application No. 18155779.4, dated Apr. 17, 2018, pp. 1-15.
Office Communication for U.S. Appl. No. 16/228,716 dated Jun. 24, 2019, pp. 1-28.
Office Communication for U.S. Appl. No. 16/231,354 dated Jul. 10, 2019, pp. 1-19.
Office Communication for U.S. Appl. No. 16/226,587 dated Aug. 5, 2019, pp. 1-55.
Office Communication for U.S. Appl. No. 16/228,716 dated Feb. 28, 2019, pp. 1-27.
Office Communication for U.S. Appl. No. 16/231,354 dated Mar. 25, 2019, pp. 1-19.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Dike: Virtualization-aware Access Control for Multitenant Filesystems", Feb. 18, 2013, pp. 1-6.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-22.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.

(56) References Cited

OTHER PUBLICATIONS

Office Communication for U.S. Appl. No. 14/595,043 dated May 4, 2017, pp. 1-38.
Office Communication for U.S. Appl. No. 14/595,043 dated Feb. 23, 2018, pp. 1-22.
Office Communication for U.S. Appl. No. 14/595,043 dated May 25, 2018, pp. 1-14.
Office Communication for U.S. Appl. No. 14/595,043 dated Oct. 5, 2018, pp. 1-26.
Office Communication for U.S. Appl. No. 14/595,043 dated Jun. 7, 2019, pp. 1-29.
Office Communication for U.S. Appl. No. 14/595,043 dated Aug. 27, 2019, pp. 1-34.
Office Communication for U.S. Appl. No. 14/658,015 dated Apr. 27, 2017, pp. 1-8.
Office Communication for U.S. Appl. No. 14/658,015 dated Jan. 4, 2018, pp. 1-35.
Office Communication for U.S. Appl. No. 14/658,015 dated Jul. 13, 2018, pp. 1-18.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 14/859,114 dated Jul. 24, 2017, pp. 1-165.
Office Communication for U.S. Appl. No. 14/859,114 dated Feb. 21, 2018, pp. 1-27.
Office Communication for U.S. Appl. No. 14/859,114 dated May 11, 2018, pp. 1-7.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, pp. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Patent Application No. 17206518.7 dated Apr. 5, 2018, pp. 1-8.
Karatza et al, "Epoch load sharing in a network of workstations," Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 15/694,604 dated Nov. 20, 2019, pp. 1-24.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_ science) (Year: 2019), pp. 1-4.
Office Communication for U.S. Appl. No. 16/004,182 dated Mar. 23, 2020, pp. 1-6.
Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/004,182 dated Apr. 28, 2020, pp. 1-52.
Office Communication for U.S. Appl. No. 16/152,259 dated Apr. 29, 2020, pp. 1-19.
Office Communication for U.S. Appl. No. 14/859,114 dated Jun. 5, 2020, pp. 1-6.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 14/859,114 dated Jul. 23, 2020, pp. 1-28.
Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/775,041 dated Aug. 18, 2020, pp. 1-17.
Office Communication for U.S. Appl. No. 16/883,879 dated Sep. 1, 2020, pp. 1-18.

(56) References Cited

OTHER PUBLICATIONS

Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2016/38242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Falls, Massachusettes, pp. 422-426.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.

* cited by examiner

DATA REPLICATION IN DISTRIBUTED FILE SYSTEMS

TECHNICAL FIELD

The present invention relates generally to file systems, and more particularly, but not exclusively, to managing file system replication in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. Naïve backup strategies may cause significant storage or performance overhead. For example, in some cases, the size or distributed nature of a modern hyper-scale file systems may make it difficult to determine the objects that need to be replicated. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE INVENTION

Figure 1:
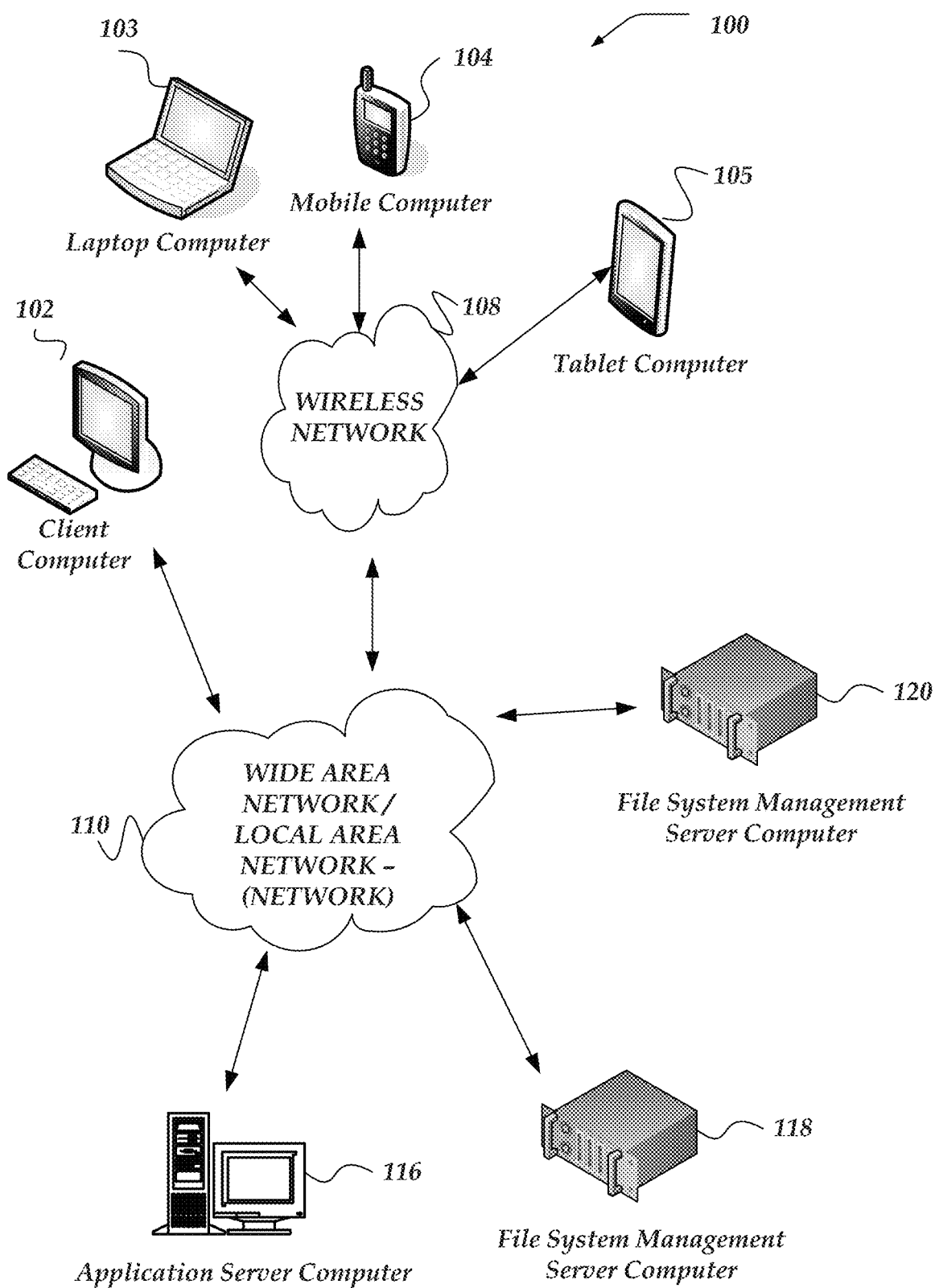
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "epoch," or "file system epoch" refer to time periods in the life of a file system. Epochs may be generated sequentially such that epoch 1 comes before epoch 2 in time. Prior epochs are bounded in the sense that they have a defined beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. Snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to number epochs and snapshots sequentially, the epoch value or its number label may be assumed to be greater than the number label of the newest snapshot. Epoch boundaries may be formed when a snapshot is taken. The epoch (e.g., epoch count value) is incremented if a snapshot is created. Each epoch boundary is created when a snapshot was created. In some case, if a new snapshot is created, it may be assigned a number label that has the same as the epoch it is closing and thus be one less than the new current epoch that begins running when the new snapshot is taken.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a replication engine may be instantiated to perform various actions as described herein.

In one or more of the various embodiments, the replication engine may be arranged to provide a root node for a file in a file system that may be associated with a replication snapshot such that the file may be comprised of the root node, one or more internal nodes, and one or more data nodes. In one or more of the various embodiments, the replication snapshot may be associated with an epoch of the file system.

In one or more of the various embodiments, the replication engine may be arranged to start at the root node, and traverse the file system. In response to a visited internal node having an epoch value that matches the epoch, the replication engine may be arranged to continue the traversal by visiting a next unvisited adjacent internal node. In response to the visited internal node having an epoch value that mismatches the epoch, in some embodiments, the replication engine may be arranged to backtrack to a nearest adjacent internal node that matches the epoch. And, in response to visiting a data node, in some embodiments, the replication engine may be arranged to determine one or more blocks that are associated with the data node such that the performance of the one or more processors is improved by excluding from replication operations one or more portions of the file when the epoch is mismatched to the epoch value. And, in some embodiments, the replication engine may be arranged to communicate a copy of the one or more blocks to a target file system. In one or more of the various embodiments, determining the one or more blocks may include determining a count of the one or more blocks based on a run-length value that is included in the data node. In some embodiments, data nodes may comprise a starting address value and a run length value that define a contiguous set of blocks starting at the starting address and continuing up to the run length value.

In one or more of the various embodiments, the replication engine may be arranged to determine an amount of data associated with the file based on a sum of a size of each determined block. And, in one or more of the various embodiments, the replication engine may be arranged to provide an indicator that may be used to display one or more characteristics that may be associated with a completion status that may be associated with the communication of the one or more determined blocks such that the one or more characteristics may include one or more of a time remaining to finish communicating the one or more blocks to the target file system, an amount of data communicated to the target file system, a percentage of completion of the communication of the one or more blocks, or the like.

In one or more of the various embodiments, the replication engine may be arranged to: provide a key value that corresponds to a first block of the file; determine a first data node of the file based on the key value; starting at the first data node of the file, the replication engine may be arranged to performing further actions including: iteratively, determining a data node that is adjacent to a current data node based on a link from a current data node to the next adjacent data node; determining one or more differences between the file on the file system and a version of the file on the target file system based on the data nodes such that each difference corresponds to a mismatch between the epoch associated with the one or more data nodes in the file on the file system and a separate epoch associated with one or more other data nodes in the file on the target file system.

In one or more of the various embodiments, a file system engine may be instantiated to performs actions, including, in response, to receiving a write request that may be associated with the file, generating a new version of the root node that is associated with a current epoch such that the previous version of the root node remains stored on the file system.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, file system management server computer 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118 or file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116, file system management server computer 118, file system management server computer 120, or the like, each as a single computer, the innovations or embodiments are not so limited. For example, one or more functions of application server computer 116, file system management server computer 118, file system management server computer 120, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, file system management server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
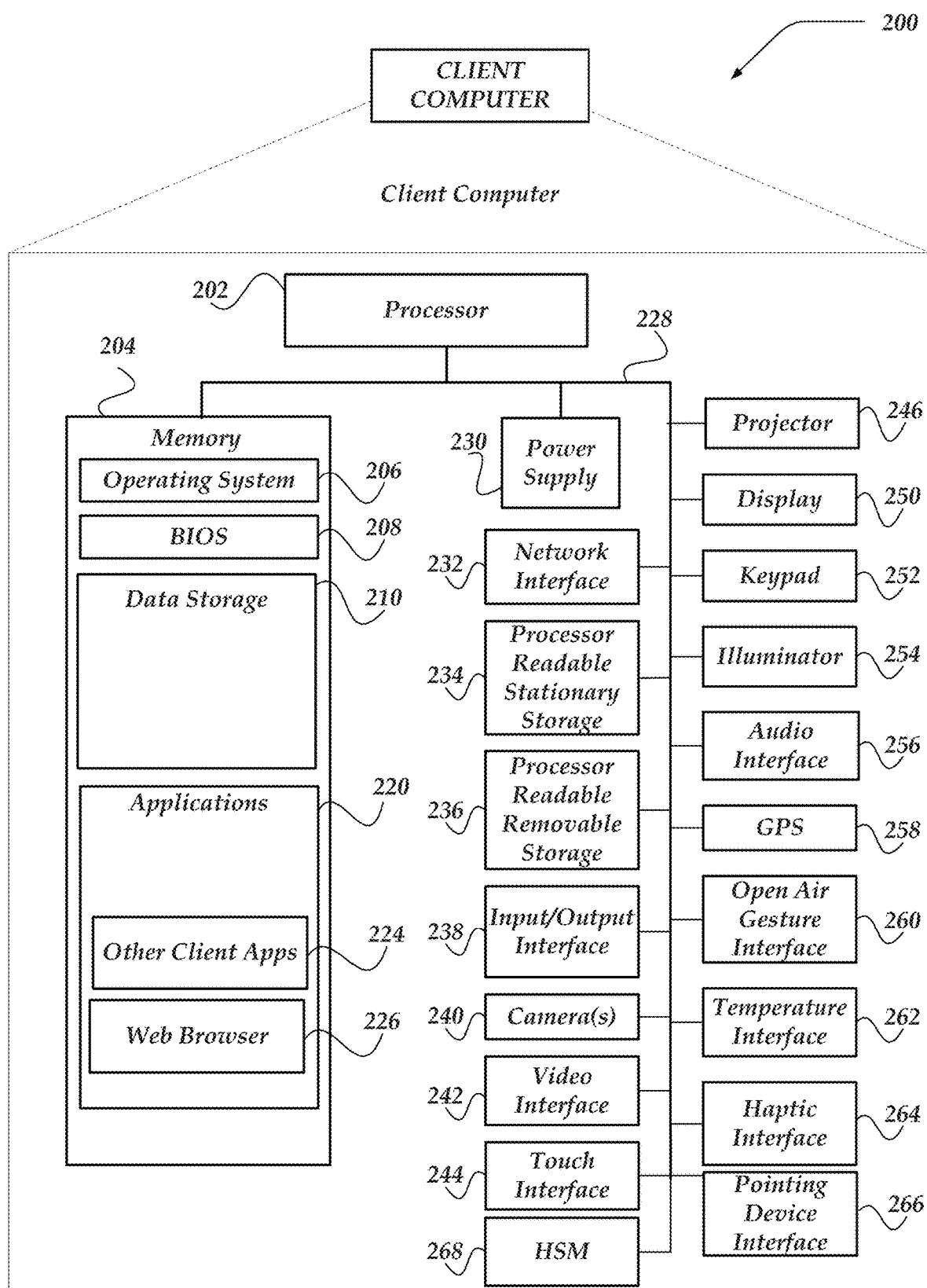
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™ or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiments, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
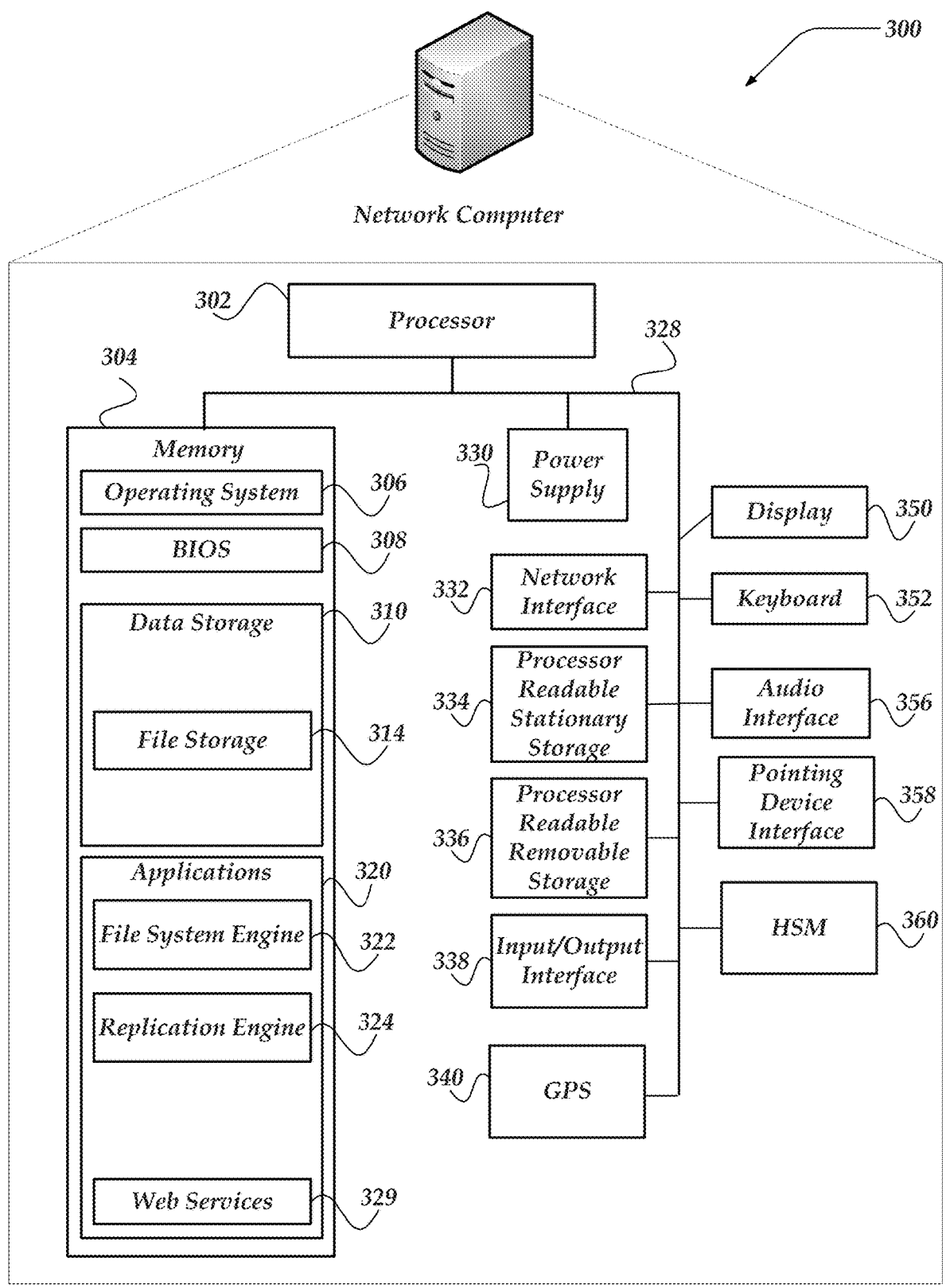
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, file system management server computer 118, or file system management server computer 120 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, replication engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, permissions information, file meta-data, data structures, or the like, that represent one or more portions of a distributed file system.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, replication engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, replication engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, replication engine 324, web services 329, or the like, may be provisioned and de-commissioned automatically.

Also, in one or more of the various embodiments, file system engine 322, replication engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
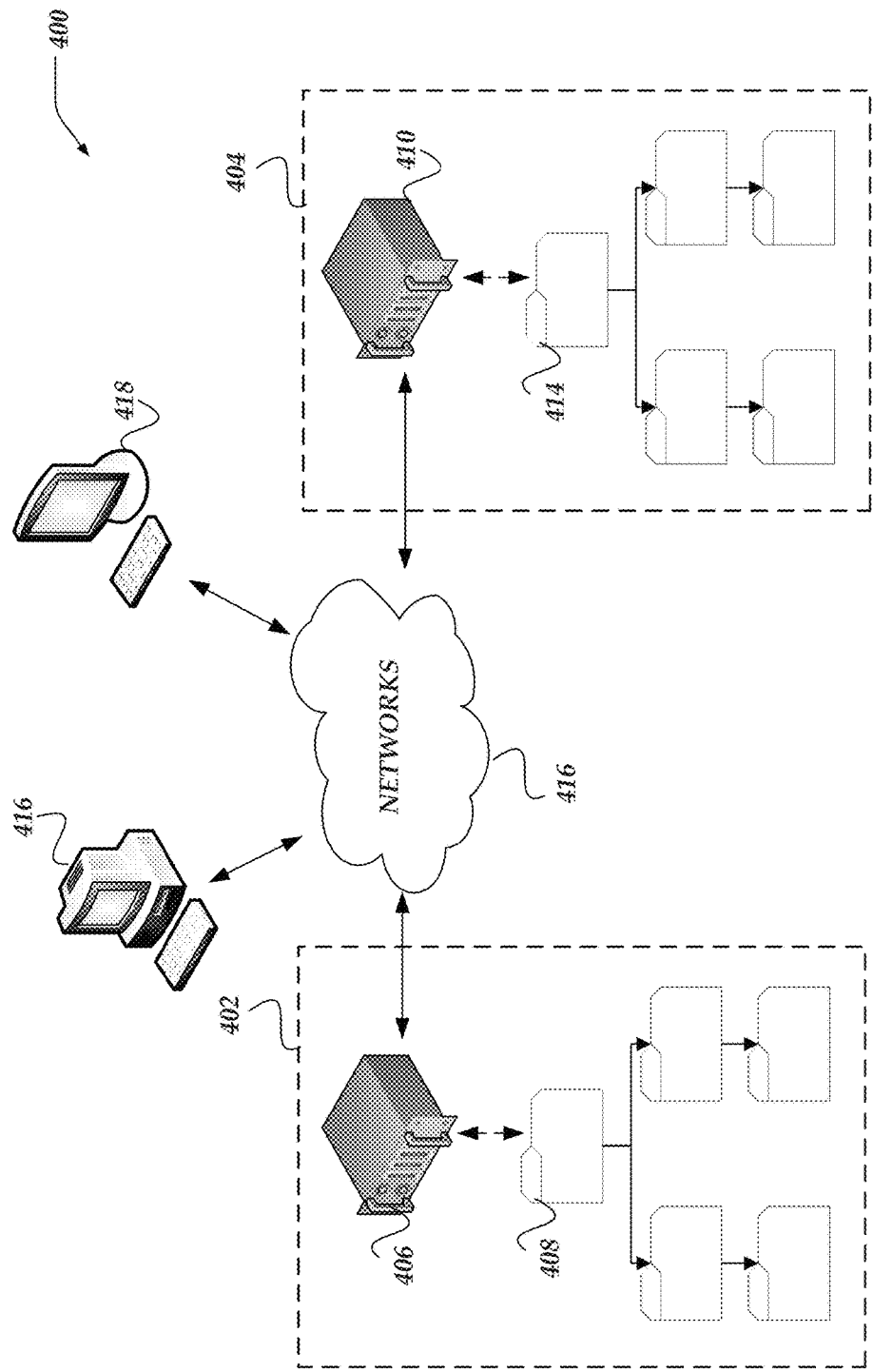
FIG. 4 illustrates a logical architecture of a system for data replication in distributed file systems in accordance with one or more of the various embodiments.

FIG. 4 illustrates a logical architecture of system 400 for data replication in distributed file systems in accordance with one or more of the various embodiments. In one or more of the various embodiments, two or more file systems, such as, file system 402 and file system 404 may be arranged to be communicatively coupled to one or more networks, such as, networks 416. Accordingly, in one or more of the various embodiments, one or more clients, such as, client computer 416 and client computer 418 may be arranged to access file system 402 or file system 404 over networks 416. In some embodiments, clients of file system 402 or file system 404 may include users, services, programs, computers, devices, or the like, that may be enabled to perform one or more file system operations, such as, creating, reading, updating, or deleting data (e.g., file system objects) that may be stored in file system 402 or file system 404. In some embodiments, file system 402 or file system 404 may comprise one or more file system management computers, such as file system management computer 406 or file system management computer 410. Also, in one or more of the various embodiments, file systems, such as file system 402 or file system 404 may include one or more file system objects, such as file system object 408 or file system object 414. file system object 412 or file system object 414 may represent the various objects or entities that may be stored in file system 402 or file system 404. In some embodiments, file system objects may include, files, documents, directories, folders, change records, backups, snapshots, replication information, versions, branches, or the like.

In one or more of the various embodiments, the implementation details that enable file system 402 or file system 404 to operate may be hidden from clients, such that they may be arranged to use file system 402 or file system 404 the same way they use other conventional file systems, including local file systems. Accordingly, in one or more of the various embodiments, clients may be unaware that they are using a distributed file system that supports replicating file object to other file systems because file system engines or replication engines may be arranged to mimic the interface or behavior of one or more standard file systems.

Also, while file system 402 and file system 404 are illustrated as using one file system management computer each with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In some embodiments, one or more replications engines may be running on a file system management computer, such as, file system management computer 406 or file system management computer 410. In some embodiments, replication engines may be arranged to perform actions to replicate of one or more portions of one or more file systems.

In one or more of the various embodiments, the replication engine may be arranged to enable users to associate one or more portions of a source file system with a target file system. In one or more of the various embodiments, configuration information may be employed to identify a portion of the source file system and a location in the target file system.

In one or more of the various embodiments, it may be desirable to configure file systems, such as, file system 402 to be replicate onto one or more different file systems, such as, file system 404. Accordingly, upon being triggered (e.g., via schedules, user input, continuous replication, or the like), a replication engine running on a source file system, such as, file system 402 may be arranged to replicate its file system objects on one or more target file systems, such as, file system 404. In some embodiments, replication engines may be arranged to replicate file system objects based on snapshot values or current update epochs associated with the file systems. As described below in more detail.

Figure 5:
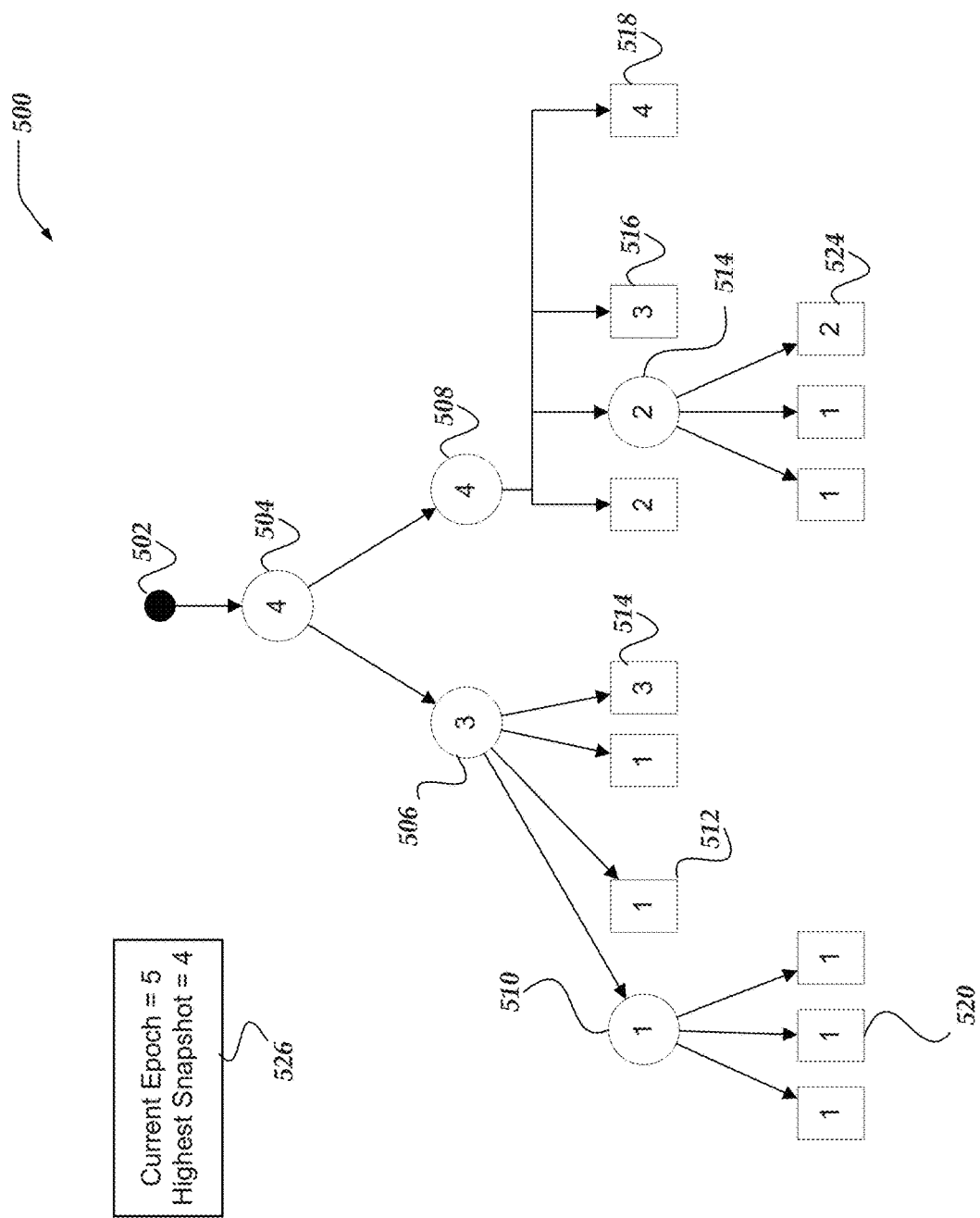
FIG. 5 illustrates a logical representation of a file system for data replication in distributed file systems in accordance with one or more of the various embodiments.

FIG. 5 illustrates a logical representation of file system 500 for data replication in distributed file systems in accordance with one or more of the various embodiments. In this example, for clarity and brevity file system 500 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 500.

In this example, circles are used to illustrate directory/folder file system objects. And, rectangles are used to represent other file system objects, such as, files, documents, or the like. The number in the center of the file system object represents the last/latest snapshot associated with the given file system object.

In this example, for some embodiments, root 502 is the beginning of a portion of a file system. Root 502 is not a file system object per se, rather, it indicates a position in a distributed file system. Directory 504 represents the parent file system object of all the objects under root 502. Directory 504 is the parent of directory 506 and directory 508. Directory 510, file object 512, and file object 514 are children of directory 506; directory 514, file object 516, and file object 518 are direct children of directory 508; file object 520 is a direct child of directory 510; and file object 524 is a direct child of directory 514. Also, in this example, for some embodiments, meta-data 526 includes the current update epoch and highest snapshot number for file system 500.

In this example, file system objects in file system 500 are associated with snapshots ranging from snapshot 1 to snapshot 4. The current epoch is number 5. Each time a snapshot is generated, the current epoch is ended and the new snapshot is associated with ending the current epoch. A new current epoch may then be generated by incrementing the last current epoch number. Accordingly, in this example, if another snapshot is generated, it will have a snapshot number of 5 and the current epoch will become epoch 6.

In one or more of the various embodiments, if two or more file systems, such as, file system 500 are arranged for replication, one file system may be designated the source file system and one or more other file systems may be designated target file systems. In some embodiments, the portions of the two or more file systems have the same file system logical structure. In some embodiments, the file systems may have different physical or implementations or representations as long as they logically represent the same structure.

In one or more of the various embodiments, at steady-state, parent file system objects, such as, directory 504, directory 506, directory 508, directory 510, directory 514, or the like, have a snapshot number based on the most recent snapshot associated with any of its children. For example, in this example, directory 504 has a snapshot value of 4 because its descendant, file object 518 has a snapshot value of 4. Similarly, directory 508 has the same snapshot value as file object 518. Continuing with this example, this is because file object 518 was modified or created sometime after snapshot 3 was generated and before snapshot 4 was generated.

In one or more of the various embodiments, if file system objects are not modified subsequent to the generation follow-on snapshots, they remain associated with their current/last snapshot. For example, in this example, directory 514 is associated with snapshot 2 because for this example, it was modified or created after snapshot 1 was generated (during epoch 2) and has remained unmodified since then. Accordingly, by observation, a modification to file object 524 caused it to be associated with snapshot 2 which forced its parent, directory 514 to also be associated with snapshot 2. In other words, for some embodiments, if a file system object is modified in a current epoch, it will be associated with the next snapshot that closes or ends the current epoch.

Compare, for example, in some embodiments, how directory 510 is associated with snapshot 1 and all of its children are also associated with snapshot 1. This indicates that directory 510 and its children were created during epoch 1 before the first snapshot (snapshot 1) was generated and that they have remained unmodified subsequent to snapshot 1.

In one or more of the various embodiments, if file system 500 is being replicated, a replication engine, such as, replication engine 324, may be arranged to employ the snapshot or epoch information of the file system objects in a file system to determine which file system objects should be copied to one or more target file systems.

In one or more of the various embodiments, replication engines may be arranged to track the last snapshot associated with the last replication job for a file system. For example, in some embodiments, a replication engine may be arranged to trigger the generation of a new snapshot prior to starting a replication jobs. Also, in some embodiments, a replication engine may be arranged perform replication jobs based on existing snapshots. For example, in some embodiments, a replication engine may be configured to launch a replication jobs every other snapshot, with the rules for generating snapshots being independent from the replication engine. Generally, in one or more of the various embodiments, replication engines may be arranged to execute one or more rules that define whether the replication engine should trigger a new snapshot for each replication job or use existing snapshots. In some embodiments, such rules may be provided by configuration files, user-input, built-in defaults, or the like, or combination thereof.

In one or more of the various embodiments, file system engines, such as, file system engine 322 may be arranged to update parent object meta-data (e.g., current update epoch or snapshot number) before a write operation is committed or otherwise consider stable. For example, if file object 520 is updated, the file system engine may be arranged to examine the epoch/snapshot information for directory 510, directory 506, and directory 504 before committing the update to file object 520. Accordingly, in this example, if file object 520 is updated, directory 510, directory 506 and directory 508 may be associated the current epoch (5) before the write to file object 520 is committed (which will also associated file object 520 with epoch 5) since the update is occurring during the current epoch (epoch 5).

Figure 6:
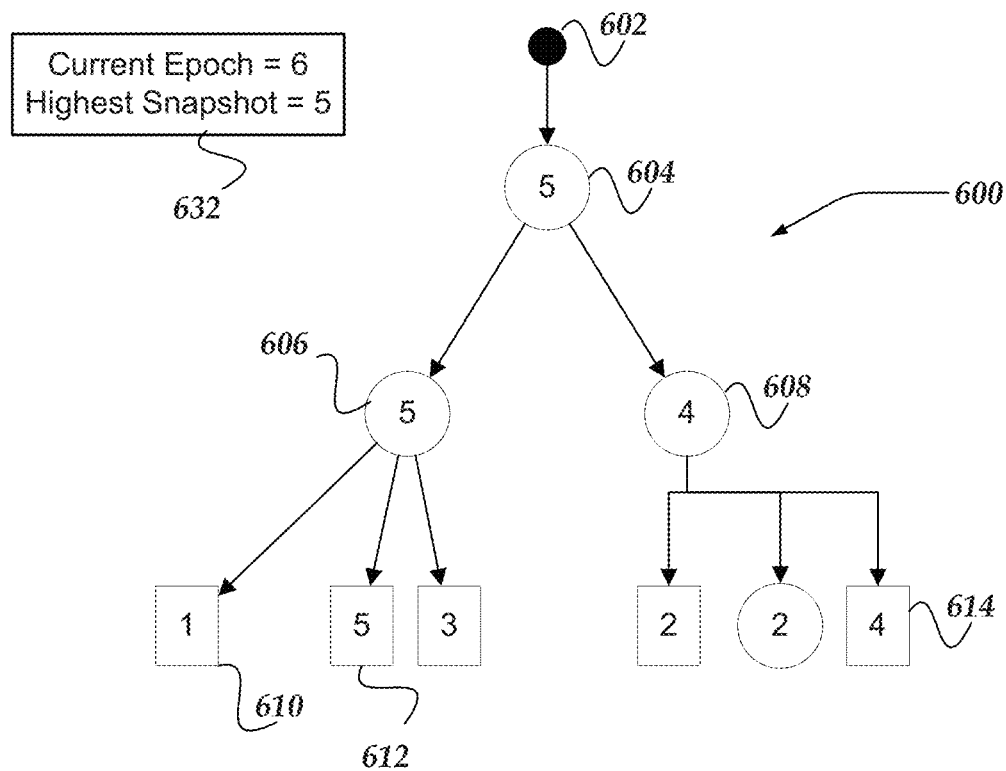
FIG. 6 illustrates a logical represent of two file systems arranged for replicating file system objects in distributed file systems in accordance with one or more of the various embodiments.
Figure 6:
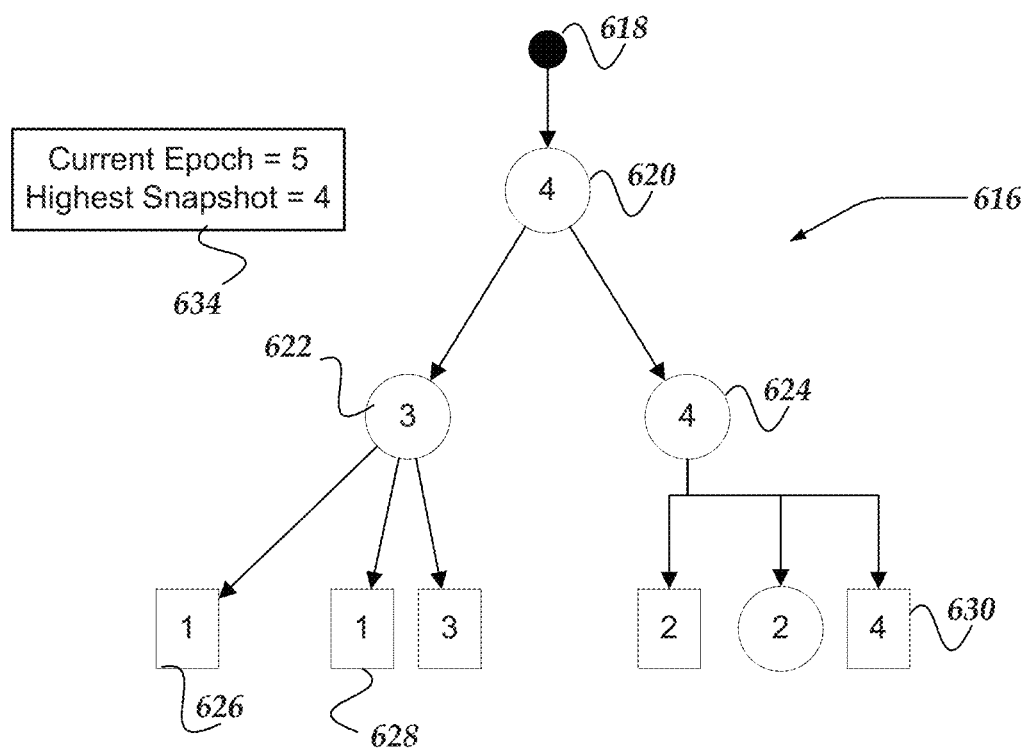

FIG. 6 illustrates a logical represent of two file systems arranged for replicating file system objects in distributed file systems in accordance with one or more of the various embodiments. In this example, file system 600 may be considered the source file system. In this example, file system 600 starts at root 602 and includes various file system objects, including, directory 604, directory 606, directory 608, file object 610, file object 612, file object 614, and so on. Likewise, for this example, file system 616 may be considered the target file system. In this example, file system 616 starts at root 618 and includes various file system objects, including, directory 620, directory 622, directory 624, file object 626, file object 628, file object 630, and so on.

Similar to FIG. 5, circles in FIG. 6 represent directory objects (file system objects that have children) and rectangles in FIG. 6 represent file system objects that are files, documents, blocks, or the like. The latest snapshot number for each file system object is indicated by the number in the center of each file system object. For example, directory object 606 is associated with snapshot number 5.

In one or more of the various embodiments, if a replication engine initiates a replication job, that job may be associated with a determined snapshot. In some embodiments, a replication engine may be arranged to trigger the generation of a snapshot before starting a replication job. In other embodiments, the replication engine may base a replication job on a snapshot that already exists. In this example, the replication engine may be arranged to initiate a replication job for the highest snapshot in file system 600, snapshot 5.

Accordingly, in one or more of the various embodiments, the replication engine may traverse file system 600 to identify file system objects that need to be copied to file system 616. In this example, as shown in the meta-data (meta-data 632) for file system 600, the current epoch for file system 600 is epoch 6 and the latest snapshot is snapshot 5. In some embodiments, the replication engine may be arranged to find the file system objects that have changed since the last replication job. In this example, meta-data 634 for file system 616 shows that the current epoch for file system 616 is epoch 5 and the latest snapshot for file system 616 is snapshot 4.

Note, in one or more of the various embodiments, the meta-data 632 or meta-data 634 may be stored such that they are accessible from either file system 600 or file system 616. Likewise, in some embodiments, one or more file systems may be provided meta-data information from another file system. In some embodiments, file systems may be arranged to communicate meta-data information, such as, meta-data 632 or meta-data 634 to another file system. In some embodiments, source file systems may be arranged to maintain a local copy of meta-data for the one or more target file systems. For example, in some embodiments, the source cluster may store the target cluster's Current Epoch/Highest Snapshot values.

In one or more of the various embodiments, file system 600 and file system 616 may be considered synced for replication. In some embodiments, configuring a replication target file system may include configuring the file system engine that manages the target file system to stay in-sync with the source file system. In some embodiments, staying in-sync may include configuring the target file system to be read-only except for replication activity. This enables snapshots on the target file system to mirror the snapshots on the source file system. For example, if independent writes were allowed on the target file system, the snapshots on the target file system may cover different file system objects than the same numbered snapshots on the source file system. This would break the replication process unless additional actions are taken to sync up the target file systems with the source file system.

In this example, a replication engine is configured to replicate file system 600 on file system 616. For this example, it can also be assumed that snapshot 5 of file system 600 is the latest snapshot that the replication engine is configured to replicate.

Accordingly, in this example, in one or more of the various embodiments, the replication engine may be arranged to determine the file system objects in file system 600 that need to be replicated on file system 616. So, in this case, where file system 616 has been synced to snapshot 4 of file system 600, the replication engine may be arranged to identify the file system objects on file system 600 that are associated with snapshot 5. The file system objects associated with snapshot 5 on file system 600 are the file system objects that need to be replicated on file system 616.

In one or more of the various embodiments, the replication engine may be arranged to compare the snapshot numbers associated with a file system object with the snapshot number of the snapshot that is being replicated to the target file system. Further, in one or more of the various embodiments, the replication engine may begin this comparison at the root of the source file system, root 602 in this example.

In one or more of the various embodiments, if the comparison discovers or identifies file system objects that have been modified since the previous replication job, those file system objects are the ones that need to be copied to the target file system. Such objects may be described as being in the replication snapshot. This means that that the file system object has changes that occurred during the lifetime of the snapshot the replication job is based on—the replication snapshot. If a directory object is determined to be in the replication snapshot, the replication engine may be arranged to descend into that object to identify the file system objects in that directory object that may need to be replicated. In contrast, if the replication engine encounters a directory object that is not in the replication snapshot, the replication engine does not have to descend into the that directory. This optimization leverages the guarantee that the snapshot value of a parent object is the same as the highest (or newest) snapshot that is associated with one or more of its children objects.

In one or more of the various embodiments, if the replication engine identifies file system objects in the source file system that may be eligible for replication, the contents of those file system objects may be copied to target file system. In one or more of the various embodiments, writing the data associated with the identified file system objects to the target file systems also includes updating the snapshot information and current epoch of the target file system.

In this example, file system 600 is being replication to file system 616. FIG. 6 shows how file system 616 appears before the replication has completed. At the completion of the replication job, file system 616 will appear the same as file system 600, including an update to meta-data 634 that will record the current epoch for file system 616 as epoch 6 and set the highest snapshot to snapshot 5.

In this example, the file system objects that a replication engine would identify for replication include directory 604, directory 606, and file object 612 as these are the only objects in file system 600 that are associated with snapshot 5 of file system 600. In one or more of the various embodiments, after these file system object are copied to file system 616, file system 616 will look the same as file system 600. Accordingly, in this example: directory 620 will be associated with snapshot 5 (for file system 616); directory 622 will be associated with snapshot 5; and file object 628 will be modified to include the content of file object 612 and will be associated with snapshot 5.

In one or more of the various embodiments, after the replication engine has written the changes associated with the replication job to the one or more target file systems, it may be arranged to trigger the generation of a snapshot to capture the changes made by the replication job.

In summary, in one or more of the various embodiments, a replication job may start with a snapshot, the replication snapshot, on the source file system. One or more file system objects on the source file system are determined based on the replication snapshot. The determined file system objects may then be copied and written to the target file system. After all the determined file system objects are written to the target file system, a snapshot is taken on the target file system to preserve the association of the written file system objects to target file system replication snapshot. Note, in one or more embodiments, there may be variations of the above. For example, a target file system may be configured close the target file systems current update epoch before a new replication job starts rather than doing at the completion of a replication job. For example, the target file system may be at current update epoch 4, when a new replication job starts, one of the replication engines first actions may be to trigger a snapshot on the target file system. In this example, that would generate snapshot 4 and set the current update epoch to epoch 5 on the target file system. Then in this example, the file system objects associated with the pending replication job will be modified on the target file system during epoch 5 of the target file system, which will result in them being associated with snapshot 5 when it is generated.

Similarly, in one or more of the various embodiments, snapshot values of paired or mirrored file systems may be employed to determine the file system objects that may have changes to rollback or discard if the replication engine is syncing a file system that has a current snapshot that is higher to a file system that has a lower snapshot. Continuing with the example described above, the file system objects on the first file system that are associated with snapshot 5 may be rolled back or discarded to bring first file system in sync to snapshot 4 of the second file system.

In one or more of the various embodiments, keeping the current epoch of the source file system and the target file system the same value may be not be a requirement. It this example, it is described as such for clarity and brevity. However, in one or more of the various embodiments, a source file system and a target file system may be configured to maintain distinct and different values for current epoch and highest snapshot even though the content of the file system objects may be the same. For example, a source file system may have been active much longer than the target file system. Accordingly, for example, a source file system may have a current epoch of 1005 while the target file system has a current epoch of 5. In this example, the epoch 1001 of the source file system may correspond to epoch 1 of the target file system. Likewise, for example, if the target file system has a current epoch of 1005 and the source target file system has a current epoch of 6, at the end of a replication job, the target file system will have a current epoch of 1006.

In one or more of the various embodiments, traversing the portion of file system starting from a designated root object and skipping the one or more parent objects that are unassociated with the replication snapshot improves efficiency and performance of the network computer or its one or more processors by reducing consumption of computing resources to perform the traversal. This increased performance and efficiency is realized because the replication engine or file system engine is not required to visit each object in the file store to determine if it has changed or otherwise is eligible for replication. Likewise, in some embodiments, increased performance and efficiency may be realized because the need for additional object level change tracking is eliminated. For example, an alternative conventional implementation may include maintaining a table of objects that have been changed since the last the replication job. However, for large file systems, the size of such a table may grow to consume a disadvantageous amount of memory.

Figure 7:
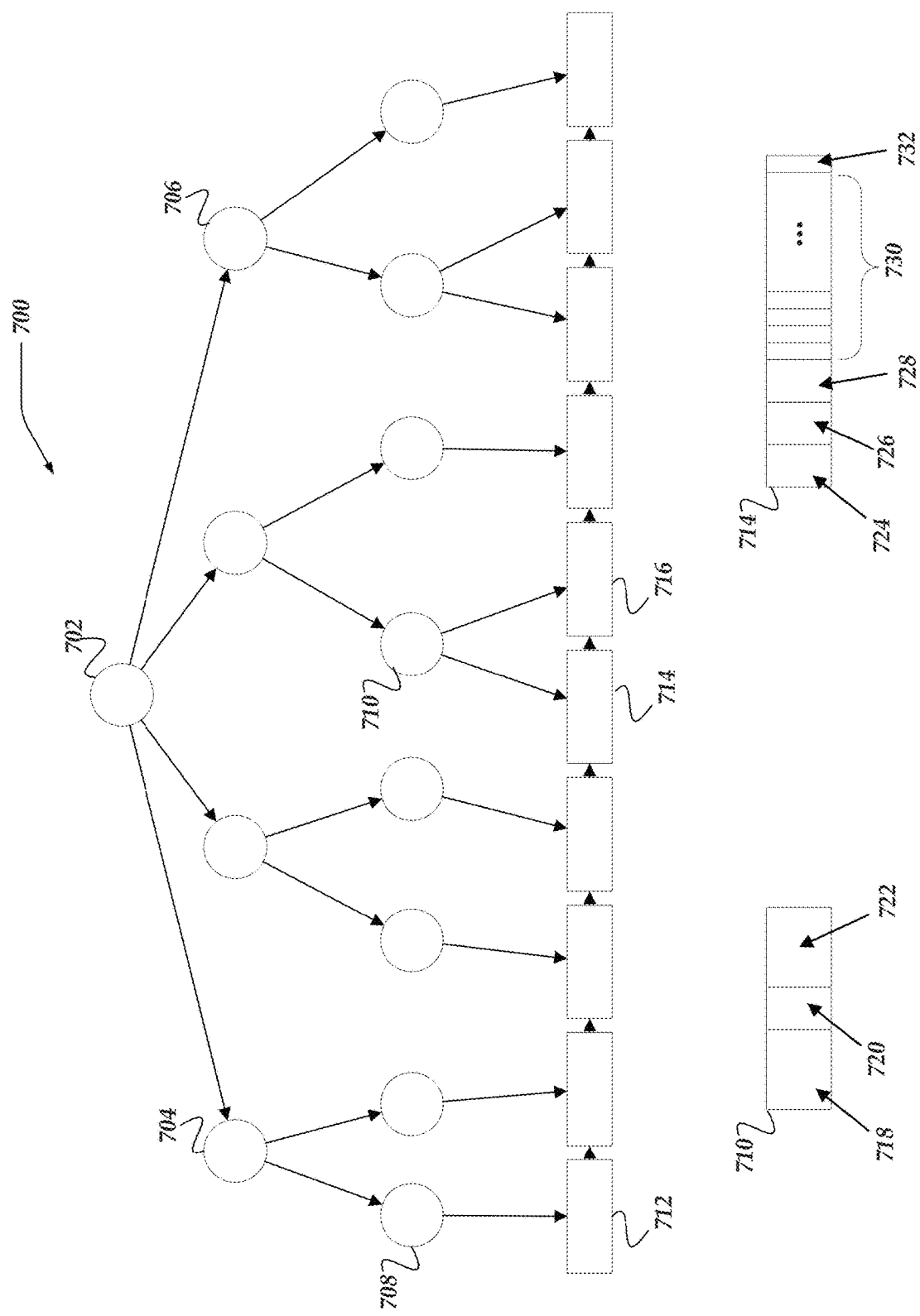
FIG. 7 illustrates a logical representation of a file data structure in a file system that supports data replication in distributed file system in accordance with one or more the various embodiments.

FIG. 7 illustrates a logical representation of file data structure 700 in a file system that supports data replication in distributed file system in accordance with one or more the various embodiments. In one or more of the various embodiments, file systems may be arranged represent files or documents using blocks. In some embodiments, blocks may be file system objects that comprise larger files or documents. In some embodiments, the size of blocks may be arranged to conform to the underlying storage media or storage sub-strata where the data included in the block is actually recorded. In some embodiments, some storage devices, such as, hard-drives or solid-state drives, may be arranged to have a minimum (or maximum) block size that corresponds to the optimal performance of a given device based on its hardware design or hardware configuration. For example, in some embodiments, the hard-drives comprising a distributed file system may be optimized for accessing, reading, or writing blocks of a certain size, such as, 16 KB, 64 KB, 1 MB, or the like.

In one or more of the various embodiments, file systems often are required to support file system objects that are comprised of many blocks. Accordingly, in one or more of the various embodiments, a file system engine, such as, file system engine 322 may be arranged to provide one or more data structures that represent files based on one or more blocks. Accordingly, in some embodiments, file systems may be arranged to employ these data structures to index, organize, or access the individual blocks that comprise files.

In this example, a file system object represented by data structure 700 may be comprised of several blocks that are indexed using one or more data structures. In this example, the different portions of data structure 700 may be organized or indexed using a tree or tree-like data-structure. In some embodiments, each file data-structure may be comprised of three types of nodes, that may be include, a root node, internal nodes, or data nodes.

In some embodiments, the root node of a file, such as, root node 702, may be the current top most node of the file data structure.

In one or more of the various embodiments, internal nodes may be nodes that include keys, meta-data, or pointers to other nodes. In some embodiments, the internal nodes do not include the content data of the file (e.g., block contents).

And, in one or more of the various embodiments, data nodes may be leaf nodes that include a key, meta-data, or one or more data blocks. Further, in some embodiments, the data nodes may be linked to neighboring data nodes to facilitate iterating over them without having to traverse internal nodes. For example, a file system engine referencing data node 714 may linked to its logically adjacent neighbor data node 716.

In some embodiments, a file system engine may be arranged to perform various actions to support the data structure 700 to represent files, such as, tree balancing, node insertion, node removal, or the like. In this example, for some embodiments, the nodes and edges comprising data structure 700 may be considered a b+tree or b+tree-like data structure. Thus, in some embodiments, basic traversal or node maintenance may include one or more conventional actions consistent with the data structure used to the represent files.

In some embodiments, internal nodes, such as, internal node 710 may be comprised of several components. Internal nodes may include one or more conventional components to support the base data structure employed to represent the file system object. For example, in this example, if the base data structure is a b+tree, each internal node may include one or more sets of key values. Accordingly, in some embodiments, internal nodes, such as, internal node 710 may include key set 718, meta-data 720, and key set 722. In one or more of the various embodiments, key sets such as key set 718 or key set 722 may include one or more key values that may be linked to internal nodes or data nodes. For example, if the data structure used to represent a file is a b+tree, one set of keys of the internal node reference other nodes that are associated with key values that are less than or equal to the value of the internal node. And, in some embodiments, another set of one or more keys in the internal node reference other nodes that are associated with key values that have a greater value than the key values associated with the internal node.

In one or more of the various embodiments, a file system engine or replication engine traversing data structure 700 may eventually visit a data node, such as, data node 714. In this example, because data structure 700 is similar to a b+tree, the data nodes are leaf nodes of data structure 700. Accordingly, in this example, data node 714, includes key information 724, meta-data 726, run length 728, data blocks 730, or the like. In some embodiments, key information 724 may be pointed-to or otherwise linked by an internal node, such as, internal node 710 in this example. In some embodiments, meta-data 726 may include information such as snapshot numbers or epoch values that correspond to when modifications were made to any of data blocks 730. And, in some embodiments, run length 728 represents the number of blocks included in data block 730.

In one or more of the various embodiments, keys may represent logical offsets into the file. Accordingly, in one or more of the various embodiments, a file system engine seeking to the beginning of a file may be arranged to search the data structure of a file to find the data node that corresponds to offset or position 1. Accordingly, the search may follow the nodes in the data structure to identify the data node that has a key value of 1. In some embodiments, the key value may be associated with an absolute address or location where the first block of the file is stored.

In some embodiments, because it is common for many blocks of a file to be accessed sequentially (in order), there may be performance improvements if logically sequential blocks are stored together and contiguously on the storage media. Accordingly, in some embodiments, data nodes may be arranged to include a run-length value (e.g., run-length 728) that stores a number representing the number of consecutive blocks associated with the data node. For example, a data node having key 100, address 34000, and run-length of 64, represents a portion of a file that corresponds to a logical offset of 100 units (e.g., bytes, words, or blocks) from the beginning of file. In this example, the data node is associated with the block corresponding to offset 100 at address 34000 and the next 63 sequential in-media contiguous blocks that follow the block at address 34000.

In some embodiments, data nodes included in data structure 700 may be arranged in ascending sort order and linked to adjacent data nodes. This may improve access performance by enabling a replication engine to access block of a file by iterating across the data nodes of the file without having to traverse the tree. For example, a file system engine seeking data node 714 may perform a traversal that starts at root node 702 and ends at data node 714. Then, in this example, if necessary, the file system engine or replication engine may find data node 716 directly from data node 714 rather than traversing the entire tree again.

Accordingly, in one or more of the various embodiments, the reference to adjacent data nodes may be stored in neighbor information 732. In some embodiments, neighbor information 732 may be a pointer to a next data node that comprises a file.

In one or more of the various embodiments, as discussed above each file stored in the file system may be associated with a snapshot number or epoch value that represents the most recent snapshot that covers the file. Note, the snapshot number associated with a file may not be the current or latest snapshot of the file system. The snapshot number associated with the file represents the snapshot that was taken after changes not included in previous snapshot were made to the file. See the description of FIG. 5 and FIG. 6 for a detailed discussion of how a file system engine may employ snapshots and epochs to track changes to file system objects.

In some embodiments, because files may be comprised of one or more smaller file system object, such as, blocks, the file system engine may be arranged to associate snapshot numbers and update epochs with the individual blocks that comprise larger file system objects, such as, files.

Accordingly, in one or more of the various embodiments, meta-data associated with each node of file data structures, such as, data structure 700 may include snapshot numbers or epoch values that are associated with changes made to the data blocks. For example, if modifications to the data blocks represented by data node 712 were last modified after snapshot 4 and before snapshot 5, snapshot 5 will have the most current version of the data. Accordingly, in this example, data node 712 may be associated with snapshot number 5 by storing the snapshot number in the meta-data of data node 712.

Figure 8:
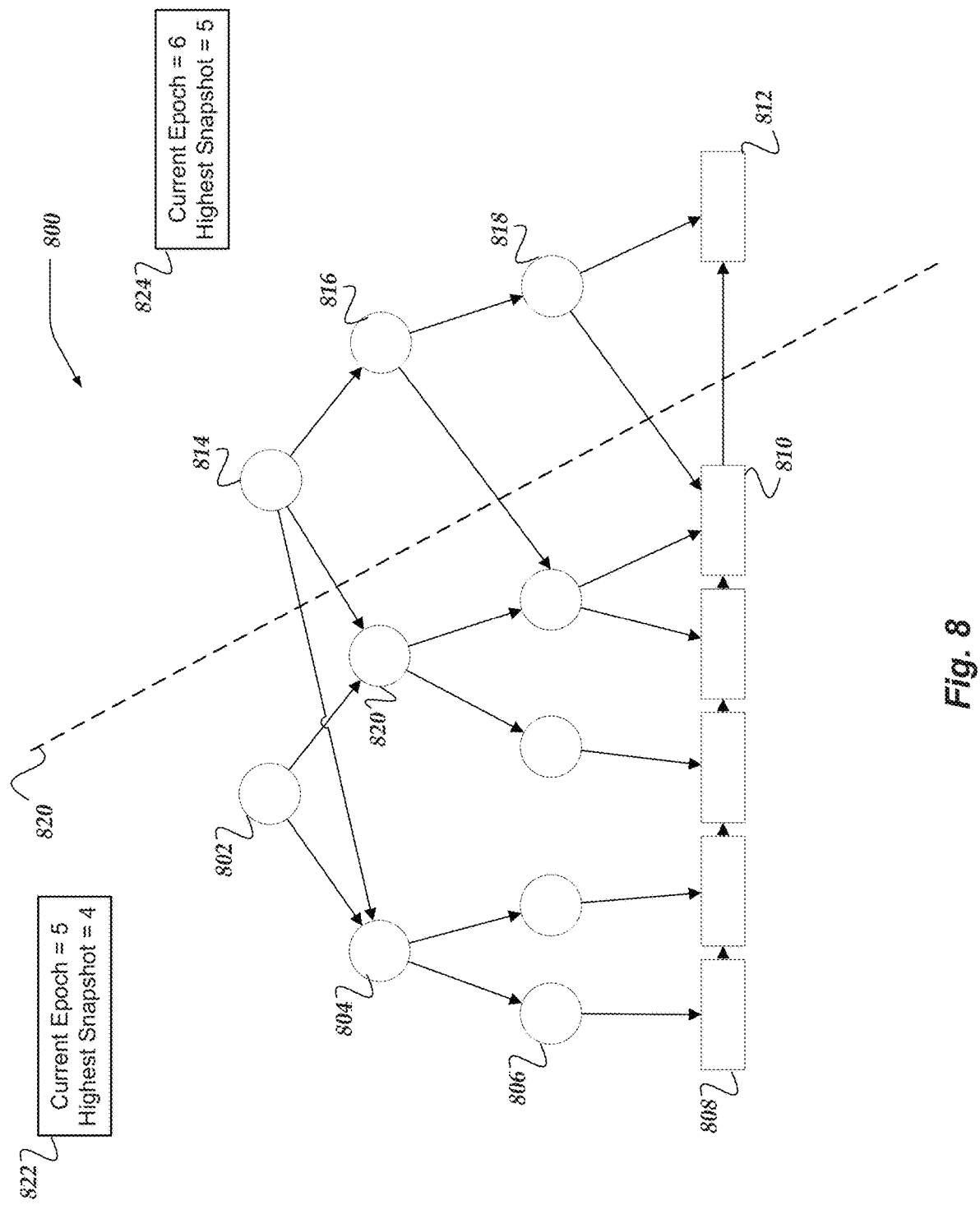
FIG. 8 illustrates a logical representation of a data structure for representing a file that has been modified in accordance with one or more of the various embodiments.

FIG. 8 illustrates a logical representation of data structure 800 representing a file that has been modified in accordance with one or more of the various embodiments. In some embodiments, snapshots may be taken that include some or all of a file system. In this example, data structure 800 represents a file that was included in a replication snapshot 5 and later modified before snapshot 6 was generated. Accordingly, in this example, blocks of the file that were modified after snapshot 5 are captured by snapshot 6 while blocks the were not modified between the time when snapshot 5 was generated and snapshot 6 was generated remain associated with snapshot 5.

In this example, for some embodiments, root node 802 is the root node associated with the version of the file associated with snapshot 5. Further, in this example, the nodes descending from root node 802, such as, internal node 804, internal node 806, data node 808, or the like, are also associated with snapshot 5.

At some time after the taking of snapshot 5, the file system engine may be tasked to modify the file. For example, a file system client may append one or more new blocks to the file. Accordingly, the file system engine may be arranged to generate one or more data nodes to hold the newly provided data. In this example, data node 812 represents a new data node that has been generated to store the additional blocks being added to the file.

In this example, data node 812 represents data appended the file, but in practice it could represent other modifications, such as, updates, deletes, attributes/permissions changes, or the like. As described above, because the blocks associated with root node 802 are in snapshot 5, their contents and state are preserved until snapshot 5 is deleted. Accordingly, modifications made to the file after snapshot 5 was taken will be associated with current epoch and the subsequent snapshot when it is generated.

Accordingly, in one or more of the various embodiments, the file system engine may be arranged to generate root node 814, internal node 816, and internal node 818 to provide a representation of the file that includes the modification represented by data node 812. In some embodiments, while some of the blocks associated with a file may have been modified, it is likely that some or many of the block remain unmodified. Accordingly, in one or more of the various embodiments, the new index starting at root node 814 enables identification or access to the unmodified blocks that are in the new version of the file. Also, at the same, clients relying on the previous version of the file may access the previous version of the data blocks via root node 802. For example, if a client is accessing an unchanged portion of the new version of file, the file system engine or replication engine may traverse from root node 814 to internal node 820 or internal node 804 to identify blocks that have been modified since previous replications or snapshots.

In this example, hashed line 820 logically represents the boundary between two versions of the file. In this example, elements of the file data structure that are to the left of hashed line 822 represent the prior version of the file that is associated with a prior snapshot. And, in this example, the elements of the file that are to right of hashed line 822 represent the subsequent version of the file.

Note, in one or more of the various embodiments, clients may include an indication of the snapshot number they are interested in. Accordingly, in some embodiments, the file system engine may employ that information to find the relevant root node to support each access request.

Figure 9:
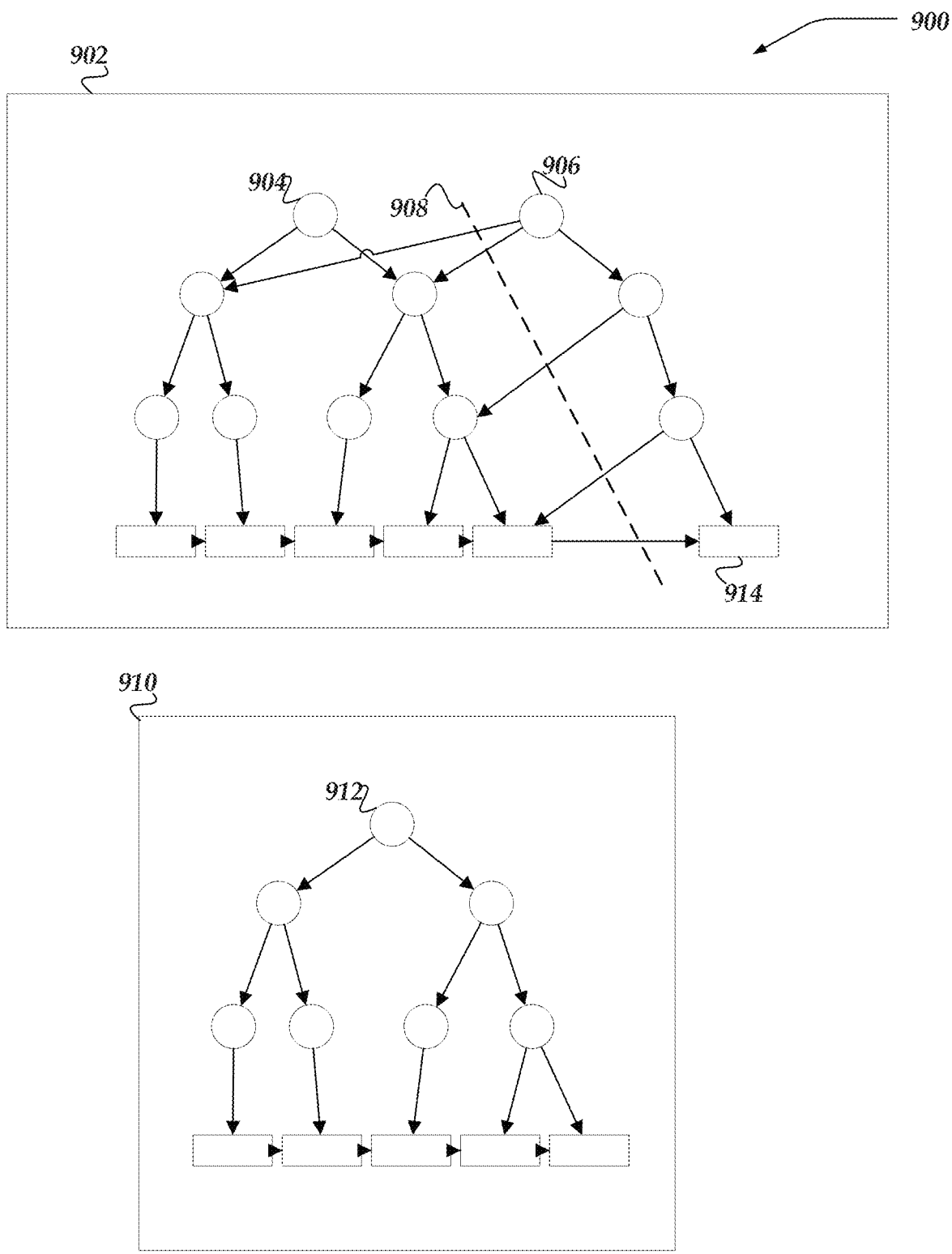
FIG. 9 illustrates a logical schematic of data structures for a system for supporting data replication in distributed file systems in accordance with one or more of the various embodiments.

FIG. 9 illustrates a logical schematic of data structures for system 900 for supporting data replication in distributed file systems in accordance with one or more of the various embodiments. In this example, a replication engine may be arranged to replicate a latest version of file 902 to another file system. In this example, file 902 is on the source file system and file 910 is on the target file system. Further, in this example, file 902 has two versions in two different snapshots. The earlier version includes the nodes that start from root node 904 and the newer version includes the nodes that start from root node 906. And, hashed line 908 represents a snapshot boundary (in time) such that nodes to the left of hashed line 908 are in the earlier version and nodes to the right of hashed line 908 are in the newer version.

In one or more of the various embodiments, a replication engine may be arranged to initiate a replication job that is directed at syncing the data in file 902 from a source file system to a target file system. In this example, it may be assumed that the data on the target file system is read-only or otherwise unmodified since the last replication job. Also, it is assumed that the source file system and the target file system are operating using separate but related snapshot numbers. For example, on the source file system, prior replication snapshot may have included the version of file 902 that starts with root node 904. And, that file 910 on the target file system is a replication of the version of file 902 that is included in the prior replication snapshot.

In one or more of the various embodiments, the replication engine may be arranged to generate a current replication snapshot on the source file system that includes the version of file 902 that starts with root node 906. Accordingly, in one or more of the various embodiments, the replication engine may be arranged to replicate the changes to file 902 that occurred between the earlier taking of the prior replication snapshot and the current replication snapshot.

In one or more of the various embodiments, the replication engine may be arranged to select a root node for the file to employ for determining the data that should be communicated to the target file system based on the snapshot number associated with the root node. For example, in some embodiments, root node 902 may be associated with replication snapshot 5 and root node 906 may be associated with replication snapshot 6. Accordingly, continuing with this example, the replication engine may determine the blocks that need to be copied from the source file system to the target file by determining the changes between the version of file 902 included in snapshot 5 and the version of file 902 included in snapshot 6.

In one or more of the various embodiments, if there were no modifications to file 902 since the last replication, it would not have a root node in the subsequent replication snapshot. Accordingly, in one or more of the various embodiments, the replication engine may immediately determine that none of the block associated with file 902 need to be copied to the target file system because there are no changes since the last copy was performed.

In this example, as illustrated, root node 906 is associated with (or in) the current replication snapshot. This indicates that at least one modification has occurred to file 902 since the earlier replication snapshot was generated.

In some embodiments, the replication engine may traverse the data-structure used to index file 902 starting at root node 906. In this example, the replication engine may determine that the two left-most edges point to internal nodes that are associated with the prior snapshot. Thus, they are not going to be associated with data nodes or block that require replication to the target file system. However, in this example, the right-most edge points to an internal node that is associated with the subsequent replication snapshot. As this traversal continues, in this example, the replication engine may determine that data node 914 is only data node that is associated with the subsequent snapshot. Accordingly, in this example, blocks associated with data node 914 are the blocks that require copying to the target file system.

In one or more of the various embodiments, one or more performance characteristics associated with determining the blocks in file that need to be copied for replication is greatly improved by employing the snapshots to determine that blocks that require copying, if any. In this example, rather than scanning the entire contents of the file or any data blocks, the replication engine may determine the blocks that require copying directly from the file data structure and the snapshot number associated with the nodes in the file data structure.

Accordingly, these innovations optimize or improve the performance of the computers performing the replication jobs at least by reducing memory requirements because none of the blocks have to be loaded into working to determine if they should be copied. Also, memory use is optimized or improved by reducing the amount of memory that must be used to traverse the index data structures. Because, as described here, the replication engine is enabled to avoid traversing nodes that are not associated with the current replication snapshot. Further, processing performance of the computers are optimized or improved at least by reducing the amount of data that requires scanning, accessing, or retrieving while still identifying the relevant data blocks.

As the blocks associated with the newer version of file 902 are copied to the target file system, a file system engine or replication engine associated with the target file system may store the blocks associated with the replication and update the index data structures on the target file system. Accordingly, in some embodiments, file 910 on the target file system may have the same or similar data structure as file 902. This updated data structure is omitted here for clarity and brevity since upon completion of the replication job the updated data structure for file 910 would appear the same as the data structure shown for file 902.

Generalized Operations

FIGS. 10-13 represent generalized operations for data replication in distributed file systems in accordance with one or more of the various embodiments. In one or more of the various embodiments, processes 1000, 1100, 1200, and 1300 described in conjunction with FIGS. 10-13 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-13 may be used for data replication in distributed file systems in accordance with at least one of the various embodiments or architectures such as those described in conjunction with FIGS. 4-9. Further, in one or more of the various embodiments, some or all of the actions performed by processes 1000, 1100, 1200, and 1300 may be executed in part by file system engine 322, or replication engine 324 running on one or more processors of one or more network computers.

Figure 10:
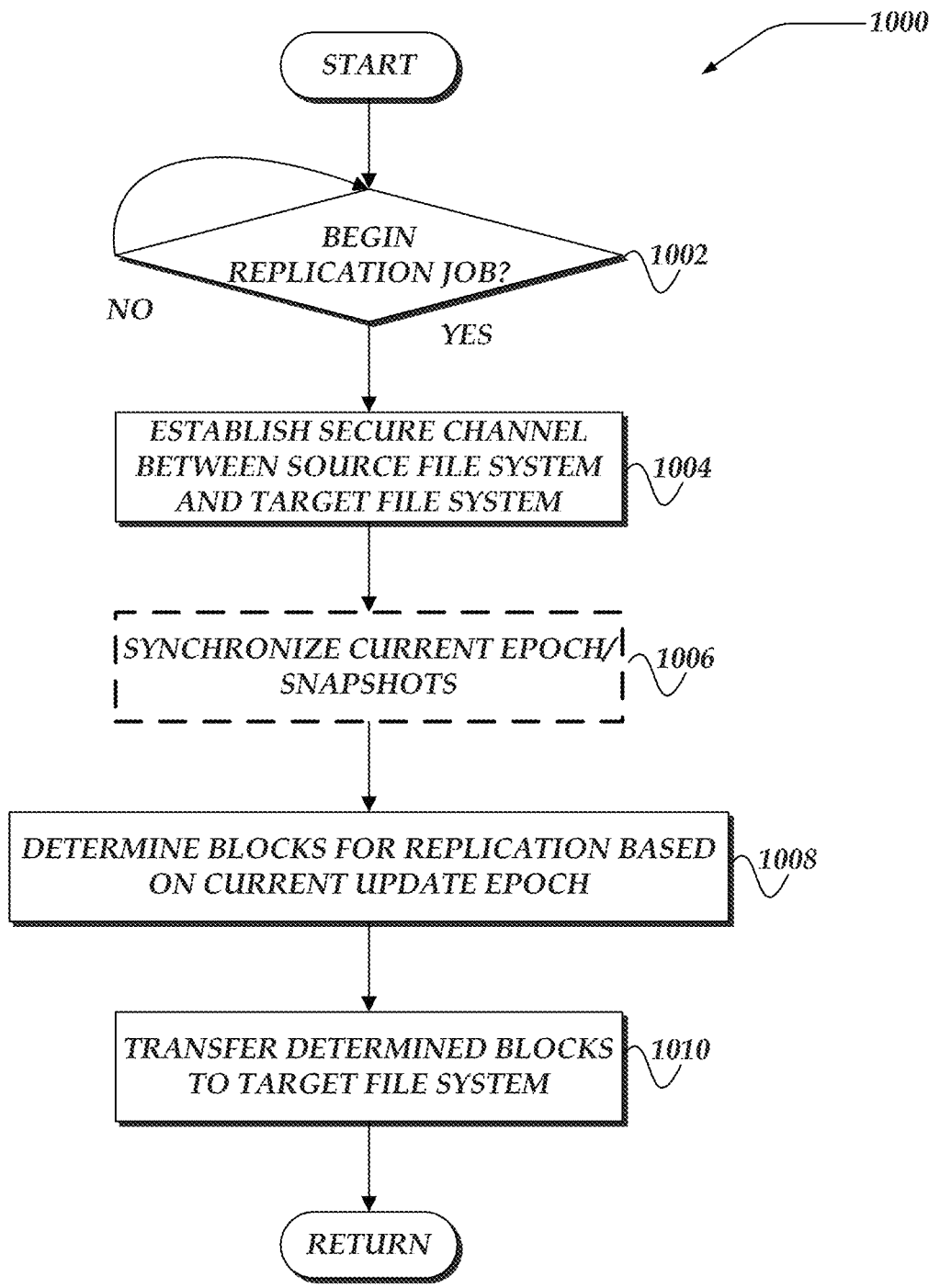
FIG. 10 illustrates an overview flowchart of a process for data replication in distributed file systems in accordance with one or more of the various embodiments.

FIG. 10 illustrates an overview flowchart of process 1000 for data replication in distributed file systems in accordance with one or more of the various embodiments. After a start flowchart block, at decision block 1002, in one or more of the various embodiments, if a replication job is started, a replication engine, such as, replication engine 324 may be instantiated to perform various, starting at flowchart block 1004; otherwise, control may loop back to decision block 1002.

At flowchart block 1004, in one or more of the various embodiments, the replication engine or file system engine may establish or confirm a secure communication channel between a source file system and one or more target file systems. In some embodiments, a replication engine or a file system engine may be arranged to select or employ a secure channel that may be configured separately. For example, in some embodiments, replication engines may use one or more virtual private networks, secure tunnels, secure connections, or the like, that have been setup prior to the start of a replication job. In some embodiments, replication engines or file system engines may be arranged to establish a new secure connection for each replication job. In other embodiments, one or more preexisting secure connections may be used.

In one or more of the various embodiments, secure connections may be established using conventional or customized methods. In some embodiments, the some or all of the credential information that is necessary to establish the secure communication channels may be stored in configuration information or provided via user input, and may include, SSL/TLS certificates, passwords, pass phrases, one or more cryptographic keys or key pairs, or the like, or combination thereof.

At flowchart block 1006, in one or more of the various embodiments, optionally, the replication engine may interrogate the target file system to determine one or more characteristics that may be relevant to the pending replication job. In some embodiments, the replication engine may determine that one or more of the target file systems are not in-sync with the source file system or otherwise prepared for the replication job. For example, the target file system may be behind one or more snapshots/epochs relative to the source file system. Or, in some embodiments, the replication engine may discover that the target file system has been independently modified since the last replication job.

Accordingly, in one or more of the various embodiments, the replication engine may be arranged to generate one or more additional replication jobs or extend/expand the pending replication job to ensure that the target file system is synchronized with the source file system before running the pending replication job. In one or more of the various embodiments, this may include adding earlier source snapshots to the replication job; rolling back writes/modifications on the target file system; pushing changes in the target file system to the source file system before running the replication job, or the like, or combination thereof.

This flowchart block is indicated as being optional, because if the one or more target file systems are in-sync with the source file system, it may be omitted.

At flowchart block 1008, in one or more of the various embodiments, the replication engine may be arranged to identify one or more blocks for replication based on the current update epoch or a designated replication snapshot. As described above, and in more detail below, the replication engine may be arranged to scan the source file system to identify files that include blocks to include in the replication job. Generally, in one or more of the various embodiments, blocks included in the replication snapshot are blocks that comprise larger file system objects that were modified during the epoch that was closed or ended by the replication snapshot.

At flowchart block 1010, in one or more of the various embodiments, the replication engine may be arranged to communicate the one or more blocks that are selected for replication from the source file system to the one or more target file systems. In one or more of the various embodiments, the replication engine may use the secure communication channel that was described for flowchart block 1004. Next, control may be returned to a calling process.

Alternatively, in one or more of the various embodiments, the replication engine may be arranged to communicate one or more blocks to the target file system as they are identified rather than identifying all of the blocks that may be replicated before a replication engine begins to communicate them to the target file system. Note, in the interest of brevity and clarity, this alternative control flow is not illustrated in FIG. 10 at least because one of ordinary skill in the art will find this written description sufficient to understand to at least these two variations and appreciate the differences between them.

Figure 11:
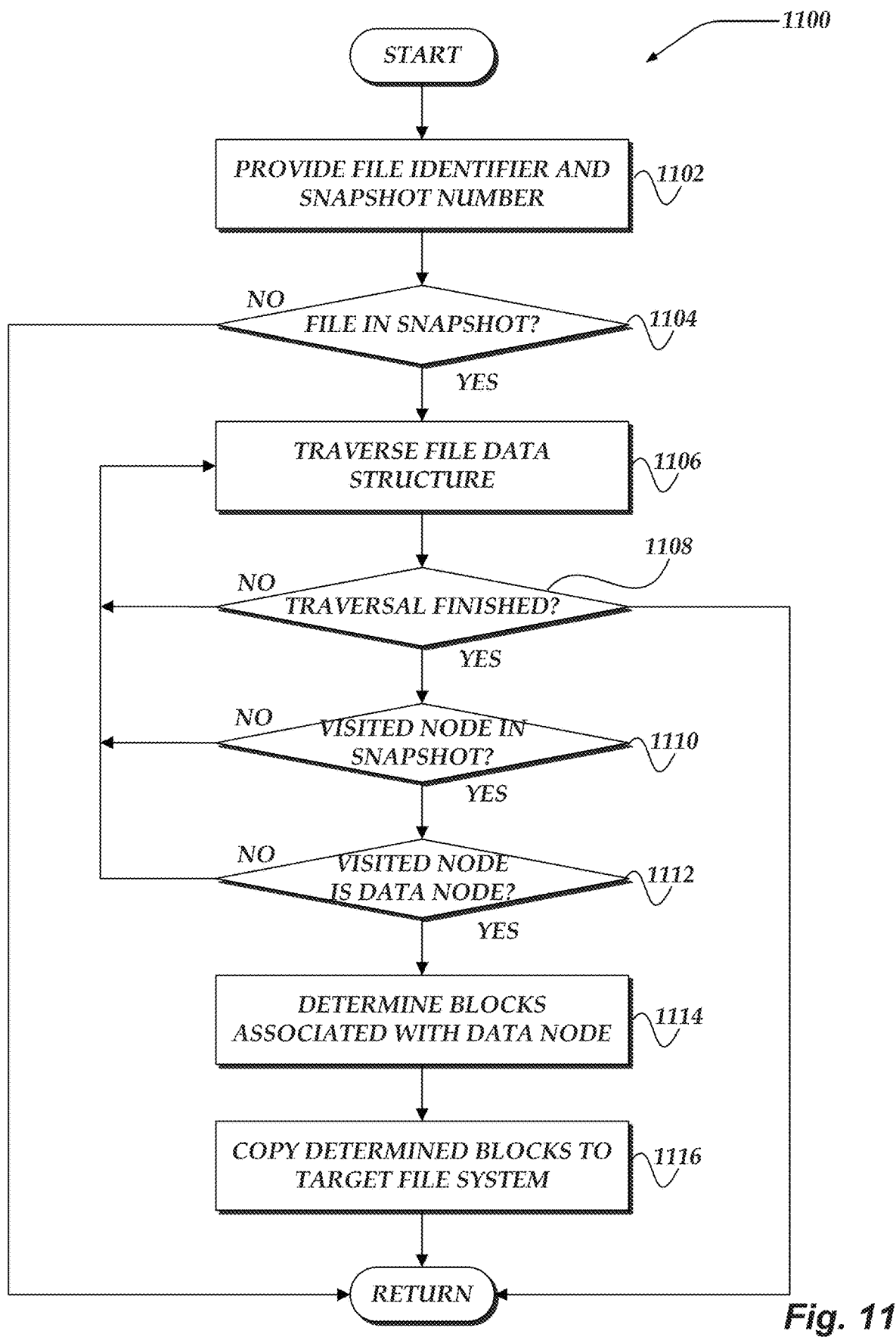
FIG. 11 illustrates a flowchart of a process for data replication of a file in distributed file systems in accordance with one or more of the various embodiments.

FIG. 11 illustrates a flowchart of process 1100 for data replication of a file in distributed file systems in accordance with one or more of the various embodiments. After a start flowchart block, at flowchart block 1102, in one or more of the various embodiments, one or more file identifiers and one or more snapshot numbers may be provided to a replication engine. In some embodiments, replication engines, or the like, may be arranged to execute actions to perform replication jobs.

As described above, in some embodiments, replication jobs may be executed to replicate a portion of a source file system by copying one or more file system objects from a source file system to a target file system. As the replication engine traverse the portion of the file system for the replication jobs, it may identify one or more files (e.g., file system objects comprised of one or more blocks) may be to be copied to the target file system. Accordingly, each relevant file may be processed by the replication engine to identify the data blocks that should be copied to the target file system.

In one or more of the various embodiments, the file identifiers may identify the file such that the replication engine may employ the file identifiers to locate, lookup, or reference the data structures that comprise the file that may be associated with the file identifier.

Also, in some embodiments, as described above, replication jobs may be associated with a snapshot number that may correspond to the replication snapshot. Accordingly, that snapshot number (or other identifiers used for identifying the replication snapshot) may be provided to the replication engine to enable it to determine one or more blocks, if any, in the file that require replication to the target file system.

At decision block 1104, in one or more of the various embodiments, if a file associated with the one or more file identifiers in the snapshot associated with the one or more snapshot number, control may flow to flowchart block 1106; otherwise, control be returned to a calling process. In one or more of the various embodiments, the replication engine may be arranged to employ the file identifiers to lookup the root node of the file in question.

In one or more of the various embodiments, the root node of the file may include meta-data that includes the current update epoch or snapshot number(s) associated with the root node. Accordingly, in some embodiments, each time a change is made to the file, a new version of the root node may be created that includes meta data that indicate the current update epoch for the file or the snapshot numbers if the file is included in one or more snapshots. Thus, in some embodiments, the replication engine may be arranged to compare the snapshot number passed in at flowchart block 1102 with snapshot number associated with the root node corresponding to the file of interest.

In some embodiments, because there may be several versions of the file, each associated with difference snapshots, the replication engine may be arranged to iterate over the root nodes of the different versions of the file to identify if one of the versions is associated with the provided snapshot number. In some embodiments, the file identifier provided to the replication engine may reference the version of interest of the file. Thus, in some embodiments, the replication engine may be arranged to omit scanning or iterating over the different root nodes of various versions that may be associated with the file of interest.

In one or more of the various embodiments, if a root node of the file is associated with the provided snapshot number the file includes one or more blocks that require replication. If the file is unassociated with the provided snapshot number the blocks associated with file were previously copied the target file system and no changes to the file may have occurred since the prior replication job and the when the snapshot associated with the provided snapshot number was taken.

At flowchart block 1106, in one or more of the various embodiments, the replication engine may be arranged to traverse one or more data structures associated with the file. As discussed above, files may be associated with one or more data structures that provide an index for the file. In some embodiments, the data structure may be a tree or tree-like structure, such as, a b+tree, or the like. Accordingly, in some embodiments, the replication engine may be enabled to visit each portion of the file via one or more traversals of the data structure.

In some embodiments, the replication engine may be arranged to begin at a root node of the file that is associated with the provided snapshot number. Next, in some embodiments, the replication engine may visit the left-side children and right-side children of the root node. In some embodiments, at each visited internal node, the replication engine may continue the traversal by visiting the left and right child of the node currently be visited.

At decision block 1108, in one or more of the various embodiments, if the traversal of the one or more data structures associated with the file is finished, control may be returned to a calling process; otherwise, control may loop back to flowchart block 1106. In some embodiments, the traversal may continue until each eligible node of the file has been visited. In some embodiments, portions of the data structure may be excluded from the traversal if they are unassociated with the snapshot associated with the provided snapshot number. For example, in some embodiments, as described above, if a parent node (e.g., root node or internal node) is not in the replication snapshot, none of its descendants, including descendant data nodes will be in the replication snapshot.

At decision block 1110, in one or more of the various embodiments, if the node being visited by the traversal is in the snapshot, control may flow to decision block 1112; otherwise, control may loop back to flowchart block 1106. In one or more of the various embodiments, the replication engine may be arranged to compare the snapshot number included in the meta-data associated the visited node associated with the provided snapshot number. For example, if the replication snapshot is snapshot number 8 and the previous replication snapshot is snapshot 7, nodes that are associated with snapshot 8 are nodes that are associated with block changes that occurred since the last replication job. And, in some embodiments, nodes associated with replication snapshot 7 (or older) are associated with block that have not changed on the source file system since they were copied to the target file system.

Note, in one or more of the various embodiments, these innovations provide an improvement to the performance of one or more computer processors by enabling the replication engine to exclude large portions of the file from the copy operations. For example, referring to FIG. 8, a replication engine that begin a traversal at root node 814 is enabled to determine the internal node 820 and internal node 904 are not associated with the replication job. Thus, in this example, the performance of the replication engine may be improved because additional nodes in those branches of the data structure may be excluded from the traversal operation. Further, in some embodiments, these innovation improve the performance of the computers, such as, network computer 300, by reducing the memory required to conduct the traversal by effectively "short-circuiting" the traversal operation which may at least reduce the amount of stack memory consumed by the replication engine.

At decision block 1112, in one or more of the various embodiments, if the node being visited by the traversal is a data node, control may flow to flowchart block 1114; otherwise, control may loop back to flowchart block 1106. In one or more of the various embodiments, as discussed above, data nodes are leaf nodes of the file data structure. Accordingly, in one or more of the various embodiments, if there are blocks in the file that require copying to the target file system, they will be associated with one or more data nodes that may be reached during the traversal of the file data structure. Note, data nodes associated with a previous replication snapshot rather than the current replication snapshot will not be visited here because the internal nodes that may be linked to them are also associated with a previous replication snapshot of a replication job that was performed earlier.

At flowchart block 1114, in one or more of the various embodiments, the replication engine may be arranged to determine one or more blocks that may be associated with the data node. As discussed above, each data node includes at least a starting address value and a run length value. Accordingly, in one or more of the various embodiments, each contiguous set of blocks starting at the starting address up to the run length value may be determined to be blocks that are eligible for copying to the target file system.

At flowchart block 1116, in one or more of the various embodiments, the replication engine may be arranged to copy the one or more determined data blocks to the target file system. In one or more of the various embodiments, copying the determined blocks from the source file system to the target file system may considered similar to a normal writing operation. Accordingly, in some embodiments, the target file system may be arranged to process the block coming from the source file system the same as it would other conventional write operations.

Next, in one or more of the various embodiments, control may be returned to a calling process.

Figure 12:
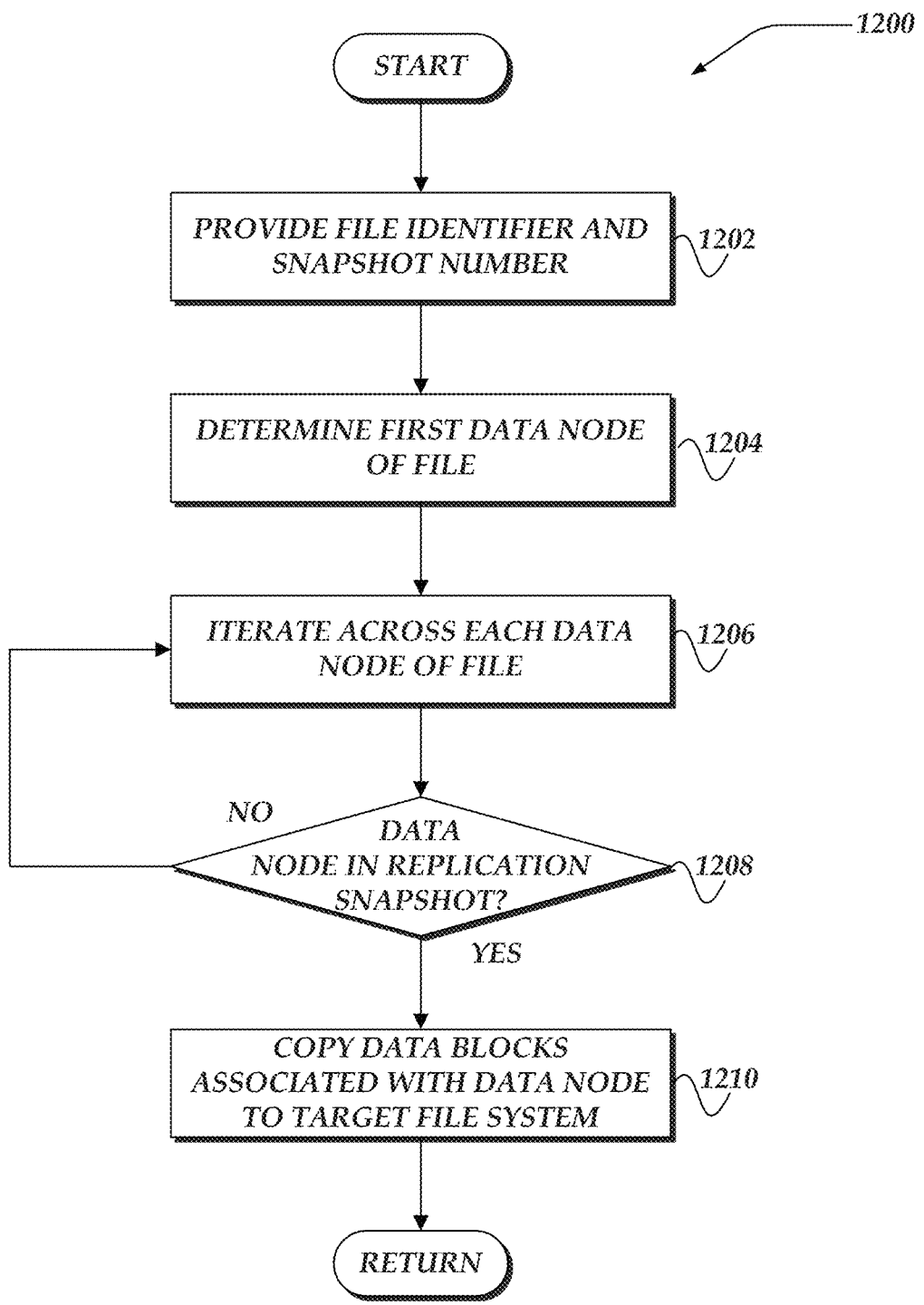
FIG. 12 illustrates a flowchart of a process for employing linked data nodes to determine block for data replication of a file in distributed file systems in accordance with one or more of the various embodiments.

FIG. 12 illustrates a flowchart of process 1200 for employing linked data nodes to determine block for data replication of a file in distributed file systems in accordance with one or more of the various embodiments. After a start flowchart block, at flowchart block 1202, in one or more of the various embodiments, a replication engine may be provided a file identifier and a snapshot number. As discussed above, during a replication job, the replication engine may identify one or more files that may include blocks that are eligible for copying from the source file system to the target file system.

At flowchart block 1204, in one or more of the various embodiments, the replication engine may be arranged to determine the first data node of the file associated with the file identifier. In some embodiments, root nodes may include meta-data the includes a pointer or reference to the first data node of a file that enables the replication engine to access at least the meta-data of the first data node.

At flowchart block 1206, in one or more of the various embodiments, the replication engine may be arranged to iterate across each data node of the file. In some embodiments, as discussed above, the data nodes of a file data structure may include links, pointers, or references to their adjacent data nodes. Accordingly, in one or more of the various embodiments, a replication engine may visit each data node in sequence without having to traverse the internal nodes of the file data structure.

Further, in one or more of the various embodiments, the replication engine may iterate over the meta-data portions of a data node such that individual data blocks associated with the data node may be omitted from the iteration. For example, in some embodiments, the data nodes may include header fields or header portions that may be distinct from the data blocks. Accordingly, in some embodiments, information about the data node (e.g., meta-data) may be read without reading, fetching, or accessing the data blocks associated with each data node.

At decision block 1208, in one or more of the various embodiments, if the data node is in the replication snapshot, control may flow to flowchart block 1210; otherwise, control may loop back to flowchart block 1206. In one or more of the various embodiments, included in the meta-data associated with each data node a field or property that at least indicates the most recent snapshot that includes the blocks associated with the data node. Accordingly, in one or more of the various embodiments, the replication engine may be arranged to compare the provided snapshot number with the snapshot number included in the data node meta-data. For example, in some embodiments, if the provided replication snapshot number is 7 and the visited data node has it most recent modifications associated with replication snapshot number 5, the replication engine will determine that the blocks associated with this data node are unchanged since the last replication job and therefore those block may be excluded from the pending replication job. In contrast, in some embodiments, continuing with this example, if the meta-data associated with the visited data node indicates that the data node is associated with the provided replication number (e.g., replication snapshot 7), the blocks associated with that data node will be included in the replication job.

At flowchart block 1210, in one or more of the various embodiments, the replication engine may be arranged to copy the blocks associated with the one or more data nodes that may be included in the replication snapshot.

In one or more of the various embodiments, rather than executing replication job, the replication engine may be arranged to perform actions for determining the differences in different versions of the same file. For example, the replication engine may determine the differences between two versions of a file by scanning the data nodes of a new version of a file to identify the block that were created, updated, or deleted since the previous snapshot of the file was taken. In some embodiments, this difference operation may be executed efficiently because the replication engine may identify all of the blocks of interest absent a comparison of the actual data in the blocks of the prior version of the file and the block in the new versions of the file. This improves the performance of a computer performing difference operations at least by eliminating the requirement to locate, retrieve, and compare the contents of each individual block of both versions the file.

Next, control may be returned to a calling process.

Figure 13:
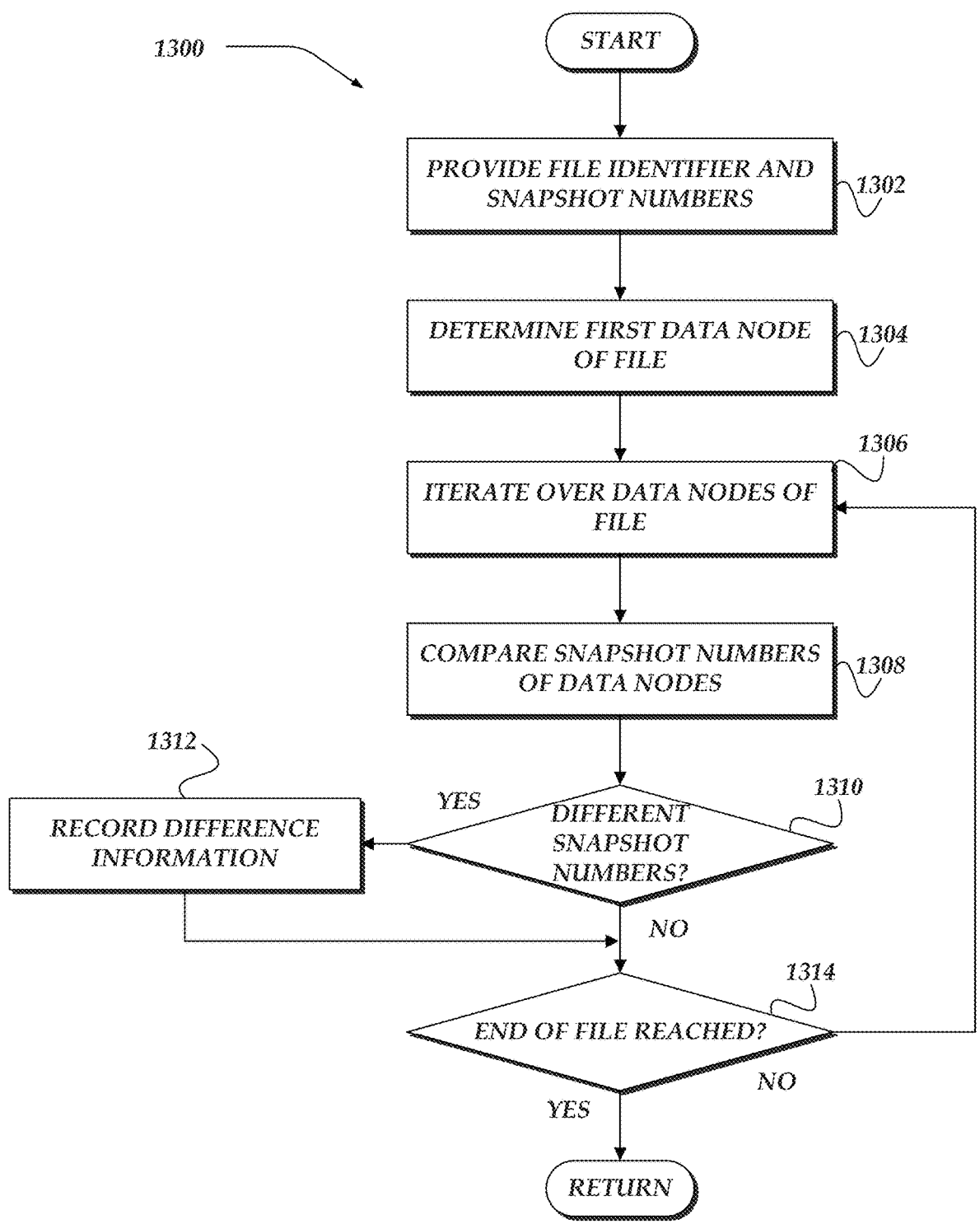
FIG. 13 illustrates a flowchart of a process for determining differences between file versions in a distributed file systems in accordance with one or more of the various embodiments.

FIG. 13 illustrates a flowchart of process 1300 for determining differences between file versions in a distributed file systems in accordance with one or more of the various embodiments. After a start flowchart block, at flowchart block 1302, in one or more of the various embodiments, one or more file identifiers and one or more snapshot numbers may be provided to a file system engine replication engine. In one or more of the various embodiments, the file identifiers may identify the file such that the file system engine or replication engine may employ the file identifiers to locate, lookup, or reference the data structures that comprise the file that may be associated with the file identifier.

Also, in some embodiments, because snapshots may be used to track different versions of files, one or more snapshot numbers may be provided to a file system engine or replication engine to enable them to perform to actions for determining one or more blocks, if any, in the file versions that are different.

At flowchart block 1304, in one or more of the various embodiments, the file system engine may be arranged to determine a first data node associated with the file. In some embodiments, if two (or more) versions of a file are being compared, the first data node of one version of the file may be located. In some embodiments, the file system engine may be arranged to traverse the file data structure starting at the root node of version of interest. For example, to find the beginning data node for a file version, the file system engine may traverse the data structure to seek the first location in the file. In some embodiments, the first data node may be associated with a key value based on the first position of the file (e.g., position 1).

At flowchart block 1306, in one or more of the various embodiments, the file system engine may be arranged to iterate over the data nodes of the file. As discussed above, in one or more of the various embodiments, the data nodes associated with a file may include pointers, links, references, or the like, to their next neighbor. Accordingly, in one or more of the various embodiments, the file system engine may be arranged to iterate across the data nodes without having to traverse the entire data structure.

At flowchart block 1308, in one or more of the various embodiments, the file system engine may be arranged to compare the snapshot numbers associated with the data nodes. The file system engine may be arranged to determine if the data nodes are in different snapshots, and therefore represent modified or updated data. For example, if a first data node for a file associated with snapshot number 5 and a second data node for a different version of the same file is associated with snapshot number 7, the file system engine may determine that the data represented by the second data node has been changed since the earlier version of the file was associated with snapshot number 5. Note, in some embodiments, the file system engine improves the compute performance, networking performance, or memory performance at least because it is arranged to perform the comparison absent scanning or otherwise retrieving the data blocks represented by the data node.

At decision block 1310, in one or more of the various embodiments, if the snapshot number associated with the data node is different than provided snapshot numbers, control may flow flowchart block 1312; otherwise, control may flow to decision block 1314.

At flowchart block 1312 in one or more of the various embodiments, the file system engine may be arranged to record the difference information. In some embodiments, this may include storing one or more records that indicate the location, address, version, snapshot number, or the like, associated with the blocks that may be associated with the data node that was determined to have a different snapshot number.

In one or more of the various embodiments, if the comparison described above, determines one or more differences associated with the provided snapshot numbers and the snapshot number(s) associated with the data nodes, information describing one or more details of the differences may be stored, reported, or the like, to be considered during subsequent actions. For example, in some embodiments, the file system engine may be configured to provide a report of the number of blocks that are different between two different snapshots. Accordingly, in this example, the file system engine may record a count of the differences. Next, control may flow to decision block 1314.

At decision block 1314, in one or more of the various embodiments, if the end of the file has been reached, control may be returned to a calling process; otherwise, control may loop back to block 1306 to continue iterating across the remaining data nodes of the file. For example, referring to FIG. 8, if the file system engine is comparing file versions where the data structure representing one version starts at root node 802 and the data structure representing another version of the file starts at root node 814, the iteration may run until data node 812 is visited.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
   instantiating a replication engine to perform actions, including:
      providing a root node for a file in a file system that is employed to initiate generation of a replication snapshot, wherein the file is comprised of the root node, one or more internal nodes, and one or more data nodes, and wherein the replication snapshot is associated with an epoch of the file system, and wherein an epoch count is incremented and a new corresponding epoch is generated each time each replication snapshot is generated, and wherein a replication snapshot count is incremented and a new corresponding replication snapshot value is generated each time each replication snapshot is generated; and
      starting at the root node associated with the replication snapshot, traversing one or more portions of the file system that are associated with the replication snapshot and skipping traversal of one or more parent objects in one or more other portions of the file system that are unassociated with the replication snapshot, to perform further actions, including:
         in response to a visited internal node having an epoch value that matches the epoch count of a current epoch and a replication snapshot value of the replication snapshot matches the replication snapshot count, continuing the traversal by visiting a next unvisited adjacent internal node;
         in response to the visited internal node having an epoch value that mismatches the epoch count of the current epoch, backtracking to a nearest adjacent internal node in the file that matches the epoch count of the current epoch; and in response to visiting a data node, performing further actions, including:

determining one or more blocks that are associated with the data node, wherein the performance of the one or more processors is improved by scanning the data node for a new version of the file to identity each block that is modified instead of scanning actual data, and wherein each identified block is excluded that has one or more of an epoch value mismatch with the epoch count of the current epoch or a version mismatch with the replication snapshot from replication operations of the file; and communicating a replicated copy of each of the one or more blocks having one or more of the epoch value match with the epoch count of the current epoch or the version match with the replication snapshot to a target file system.

2. The method of claim 1, wherein determining the one or more blocks, further comprises:
determining a count of the one or more blocks based on a run-length value that is included in the data node.

3. The method of claim 1, wherein the replication engine performs further actions, including:
determining an amount of data associated with the file based on a sum of a size of each determined block; and
providing an indicator that is used to display one or more characteristics that are associated with a completion status that is associated with the communication of the one or more determined blocks, wherein the one or more characteristics include one or more of a time remaining to finish communicating the one or more blocks to the target file system, an amount of data communicated to the target file system, or a percentage of completion of the communication of the one or more blocks.

4. The method of claim 1, wherein the replication engine performs further actions, including:
providing a key value that corresponds to a first block of the file;
determining a first data node of the file based on the key value;
starting at the first data node of the file, performing further actions including:
iteratively, determining a data node that is adjacent to a current data node based on a link from a current data node to the next adjacent data node;
determining one or more differences between the file on the file system and a version of the file on the target file system based on the data nodes, wherein each difference corresponds to a mismatch between the current epoch associated with the one or more data nodes in the file on the file system and a separate epoch associated with one or more other data nodes in the file on the target file system.

5. The method of claim 1, further comprising, instantiating a file system engine that performs actions, including:
in response, to receiving a write request that is associated with the file, generating a new version of the root node that is associated with the current epoch, wherein, the previous version of the root node remains stored on the file system.

6. The method of claim 1, wherein the data node further comprises: a starting address value and a run length value that define a contiguous set of blocks starting at the starting address and continuing up to the run length value.

7. A system for managing data in a file system comprising:
a network computer, comprising:
a transceiver that communicates over the network;
a memory that stores at least instructions; and
one or more processors that execute instructions that perform actions, including:
instantiating a replication engine to perform actions, including:
providing a root node for a file in a file system that is employed to initiate generation of a replication snapshot, wherein the file is comprised of the root node, one or more internal nodes, and one or more data nodes, and wherein the replication snapshot is associated with an epoch of the file system, and wherein an epoch count is incremented and a new corresponding epoch is generated each time each replication snapshot is generated, and wherein a replication snapshot count is incremented and a new corresponding replication snapshot value is generated each time each replication snapshot is generated; and
starting at the root node associated with the replication snapshot, traversing one or more portions of the file system that are associated with the replication snapshot and skipping traversal of one or more parent objects in one or more other portions of the file system that are unassociated with the replication snapshot, to perform further actions, including:
in response to a visited internal node having an epoch value that matches the epoch count of a current epoch and a replication snapshot value of the replication snapshot matches the replication snapshot count, continuing the traversal by visiting a next unvisited adjacent internal node;
in response to the visited internal node having an epoch value that mismatches the epoch count of the current epoch, backtracking to a nearest adjacent internal node in the file that matches the epoch count of the current epoch; and
in response to visiting a data node, performing further actions, including:
determining one or more blocks that are associated with the data node, wherein the performance of the one or more processors is improved by scanning the data node for a new version of the file to identity each block that is modified instead of scanning actual data, and wherein each identified block is excluded that has one or more of an epoch value mismatch with the epoch count of the current epoch or a version mismatch with the replication snapshot from replication operations of the file; and
communicating a replicated copy of each of the one or more blocks having one or more of the epoch value match with the epoch count of the current epoch or the version match with the replication snapshot to a target file system; and
a client computer, comprising:
a transceiver that communicates over the network;
a memory that stores at least instructions; and
one or more processors that execute instructions that perform actions, including:
providing a replication request that includes the file.

8. The system of claim 7, wherein determining the one or more blocks, further comprises:
determining a count of the one or more blocks based on a run-length value that is included in the data node.

9. The system of claim 7, wherein the replication engine performs further actions, including:
determining an amount of data associated with the file based on a sum of a size of each determined block; and
providing an indicator that is used to display one or more characteristics that are associated with a completion status that is associated with the communication of the one or more determined blocks, wherein the one or more characteristics include one or more of a time remaining to finish communicating the one or more blocks to the target file system, an amount of data communicated to the target file system, or a percentage of completion of the communication of the one or more blocks.

10. The system of claim 7, wherein the replication engine performs further actions, including:
providing a key value that corresponds to a first block of the file;
determining a first data node of the file based on the key value;
starting at the first data node of the file, performing further actions including:
iteratively, determining a data node that is adjacent to a current data node based on a link from a current data node to the next adjacent data node;
determining one or more differences between the file on the file system and a version of the file on the target file system based on the data nodes, wherein each difference corresponds to a mismatch between the current epoch associated with the one or more data nodes in the file on the file system and a separate epoch associated with one or more other data nodes in the file on the target file system.

11. The system of claim 7, further comprising, instantiating a file system engine that performs actions, including:
in response, to receiving a write request that is associated with the file, generating a new version of the root node that is associated with the current epoch, wherein, the previous version of the root node remains stored on the file system.

12. The system of claim 7, wherein the data node further comprises: a starting address value and a run length value that define a contiguous set of blocks starting at the starting address and continuing up to the run length value.

13. A processor readable non-transitory storage media that includes instructions for managing data in a file system over a network, wherein execution of the instructions by one or more processors on one or more network computers performs actions, comprising:
instantiating a replication engine to perform actions, including:
providing a root node for a file in a file system that is employed to initiate generation of a replication snapshot, wherein the file is comprised of the root node, one or more internal nodes, and one or more data nodes, and wherein the replication snapshot is associated with an epoch of the file system, and wherein an epoch count is incremented and a new corresponding epoch is generated each time each replication snapshot is generated, and wherein a replication snapshot count is incremented and a new corresponding replication snapshot value is generated each time each replication snapshot is generated; and
starting at the root node associated with the replication snapshot, traversing one or more portions of the file system that are associated with the replication snapshot and skipping traversal of one or more parent objects in one or more other portions of the file system that are unassociated with the replication snapshot, to perform further actions, including:
in response to a visited internal node having an epoch value that matches the epoch count of a current epoch and a replication snapshot value of the replication snapshot matches the replication snapshot count, continuing the traversal by visiting a next unvisited adjacent internal node
in response to the visited internal node having an epoch value that mismatches the epoch count of the current epoch, backtracking to a nearest adjacent internal node in the file that matches the epoch count of the current epoch; and
in response to visiting a data node, performing further actions, including:
determining one or more blocks that are associated with the data node, wherein the performance of the one or more processors is improved by scanning the data node for a new version of the file to identity each block that is modified instead of scanning actual data, and wherein each identified block is excluded that has one or more of an epoch value mismatch with the epoch count of the current epoch or a version mismatch with the replication snapshot from replication operations of the file; and
communicating a replicated copy of each of the one or more blocks having one or more of the epoch value match with the epoch count of the current epoch or the version match with the replication snapshot to a target file system.

14. The media of claim 13, wherein determining the one or more blocks, further comprises:
determining a count of the one or more blocks based on a run-length value that is included in the data node.

15. The media of claim 13, wherein the replication engine performs further actions, including:
determining an amount of data associated with the file based on a sum of a size of each determined block; and
providing an indicator that is used to display one or more characteristics that are associated with a completion status that is associated with the communication of the one or more determined blocks, wherein the one or more characteristics include one or more of a time remaining to finish communicating the one or more blocks to the target file system, an amount of data communicated to the target file system, or a percentage of completion of the communication of the one or more blocks.

16. The media of claim 13, wherein the replication engine performs further actions, including:
providing a key value that corresponds to a first block of the file;
determining a first data node of the file based on the key value;
starting at the first data node of the file, performing further actions including:
iteratively, determining a data node that is adjacent to a current data node based on a link from a current data node to the next adjacent data node;
determining one or more differences between the file on the file system and a version of the file on the target file system based on the data nodes, wherein each difference corresponds to a mismatch between the current epoch associated with the one or more data nodes in the file on the file system and a separate epoch associated with one or more other data nodes in the file on the target file system.

17. The media of claim 13, further comprising, instantiating a file system engine that performs actions, including:
in response, to receiving a write request that is associated with the file, generating a new version of the root node that is associated with the current epoch, wherein, the previous version of the root node remains stored on the file system.

18. The media of claim 13, wherein the data node further comprises: a starting address value and a run length value that define a contiguous set of blocks starting at the starting address and continuing up to the run length value.

19. A network computer for managing data in a file system, comprising:
a transceiver that communicates over the network;
a memory that stores at least instructions; and
one or more processors that execute instructions that perform actions, including:
instantiating a replication engine to perform actions, including:
providing a root node for a file in a file system that is employed to initiate generation of a replication snapshot, wherein the file is comprised of the root node, one or more internal nodes, and one or more data nodes, and wherein the replication snapshot is associated with an epoch of the file system, and wherein an epoch count is incremented and a new corresponding epoch is generated each time each replication snapshot is generated, and wherein a replication snapshot count is incremented and a new corresponding replication snapshot value is generated each time each replication snapshot is generated; and
starting at the root node associated with the replication snapshot, traversing one or more portions of the file system that are associated with the replication snapshot and skipping traversal of one or more parent objects in one or more other portions of the file system that are unassociated with the replication snapshot, to perform further actions, including:
in response to a visited internal node having an epoch value that matches the epoch count of a current epoch and a replication snapshot value of the replication snapshot matches the replication snapshot count, continuing the traversal by visiting a next unvisited adjacent internal node;
in response to the visited internal node having an epoch value that mismatches the epoch count of the current epoch, backtracking to a nearest adjacent internal node in the file that matches the epoch count of the current epoch; and
in response to visiting a data node, performing further actions, including:
determining one or more blocks that are associated with the data node, wherein the performance of the one or more processors is improved by scanning the data node for a new version of the file to identity each block that is modified instead of scanning actual data, and wherein each identified block is excluded that has one or more of an epoch value mismatch with the epoch count of the current epoch or a version mismatch with the replication snapshot from replication operations of the file; and
communicating a replicated copy of each of the one or more blocks having one or more of the epoch value match with the epoch count of the current epoch or the version match with the replication snapshot to a target file system.

20. The network computer of claim 19, wherein determining the one or more blocks, further comprises:
determining a count of the one or more blocks based on a run-length value that is included in the data node.

21. The network computer of claim 19, wherein the replication engine performs further actions, including:
determining an amount of data associated with the file based on a sum of a size of each determined block; and
providing an indicator that is used to display one or more characteristics that are associated with a completion status that is associated with the communication of the one or more determined blocks, wherein the one or more characteristics include one or more of a time remaining to finish communicating the one or more blocks to the target file system, an amount of data communicated to the target file system, or a percentage of completion of the communication of the one or more blocks.

22. The network computer of claim 19, wherein the replication engine performs further actions, including:
providing a key value that corresponds to a first block of the file;
determining a first data node of the file based on the key value;
starting at the first data node of the file, performing further actions including:
iteratively, determining a data node that is adjacent to a current data node based on a link from a current data node to the next adjacent data node;
determining one or more differences between the file on the file system and a version of the file on the target file system based on the data nodes, wherein each difference corresponds to a mismatch between the current epoch associated with the one or more data nodes in the file on the file system and a separate epoch associated with one or more other data nodes in the file on the target file system.

23. The network computer of claim 19, further comprising, instantiating a file system engine that performs actions, including, in response, to receiving a write request that is associated with the file, generating a new version of the root node that is associated with the current epoch, wherein, the previous version of the root node remains stored on the file system.

24. The network computer of claim 19, wherein the data node further comprises, a starting address value and a run length value that define a contiguous set of blocks starting at the starting address and continuing up to the run length value.

* * * * *